(12) United States Patent
Okuno

(10) Patent No.: US 9,772,810 B2
(45) Date of Patent: Sep. 26, 2017

(54) PRINTING APPARATUS

(71) Applicant: Tetsuya Okuno, Nagoya (JP)

(72) Inventor: Tetsuya Okuno, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 101 days.

(21) Appl. No.: 14/036,335

(22) Filed: Sep. 25, 2013

(65) Prior Publication Data

US 2014/0092431 A1   Apr. 3, 2014

(30) Foreign Application Priority Data

Sep. 28, 2012 (JP) ................................. 2012-216763

(51) Int. Cl.
*G06F 3/12* (2006.01)

(52) U.S. Cl.
CPC .......... *G06F 3/1292* (2013.01); *G06F 3/1207* (2013.01); *G06F 3/1259* (2013.01)

(58) Field of Classification Search
None
See application file for complete search history.

(56) References Cited

U.S. PATENT DOCUMENTS

2006/0245780 A1* 11/2006 Yamada ............. G03G 15/5016
   399/81
2008/0170256 A1* 7/2008 Matsuhara ............ G06F 3/1207
   358/1.15
2012/0019858 A1* 1/2012 Sato ................... H04N 1/00344
   358/1.15
2012/0077515 A1  3/2012 Oishi
2012/0206761 A1* 8/2012 Uotani .................. G06F 3/1203
   358/1.15

(Continued)

FOREIGN PATENT DOCUMENTS

JP   2000-125342 A    4/2000
JP   2005-292877 A   10/2005

(Continued)

OTHER PUBLICATIONS

Sep. 17, 2014—(US) Non-Final Office Action—U.S. Appl. No. 14/138,897.

(Continued)

*Primary Examiner* — Marivelisse Santiago Cordero
*Assistant Examiner* — Keara Harris
(74) *Attorney, Agent, or Firm* — Banner & Witcoff, Ltd.

(57) ABSTRACT

A printing apparatus includes: a first receiving unit for receiving a print job; a print execution unit; a progress status specifying unit for specifying a current progress status from among a plurality of progress statuses of a printing process including a first kind of progress status and a second kind of progress status; and a first transmitting unit configured to transmit a specific information for outputting a message according to the current progress status, to a portable device. The first transmitting unit is configured to: transmit a first kind of specific information in a case where the current progress status is the first kind of progress status; and transmit a second kind of specific information different from the first kind of specific information in a case where the current progress status is the second kind of progress status.

16 Claims, 10 Drawing Sheets

(56) References Cited

U.S. PATENT DOCUMENTS

| | | | |
|---|---|---|---|
| 2012/0212778 A1* | 8/2012 | Sakai | G06K 15/402 |
| | | | 358/1.15 |
| 2013/0107312 A1 | 5/2013 | Venkatesh | |
| 2014/0211246 A1 | 7/2014 | Okuno | |

FOREIGN PATENT DOCUMENTS

| | | |
|---|---|---|
| JP | 2007-259028 A | 10/2007 |
| JP | 2007-290324 A | 11/2007 |
| JP | 2008-177665 A | 7/2008 |
| JP | 2012-029164 A | 2/2012 |
| JP | 2013-000985 A | 1/2013 |

OTHER PUBLICATIONS

Jan. 12, 2015—(US) Notice of Allowance—U.S. Appl. No. 14/138,897.
Mar. 1, 2016—(JP) Notification of Reasons for Refusal—App 2013-014870, Partial Eng Tran.
May 10, 2016—(JP) Notification of Reasons for Refusal—App 2012-216763.
Jul. 12, 2016—(JP) Notification of Reason for Refusal—App 2013-014870, Eng Tran.

* cited by examiner

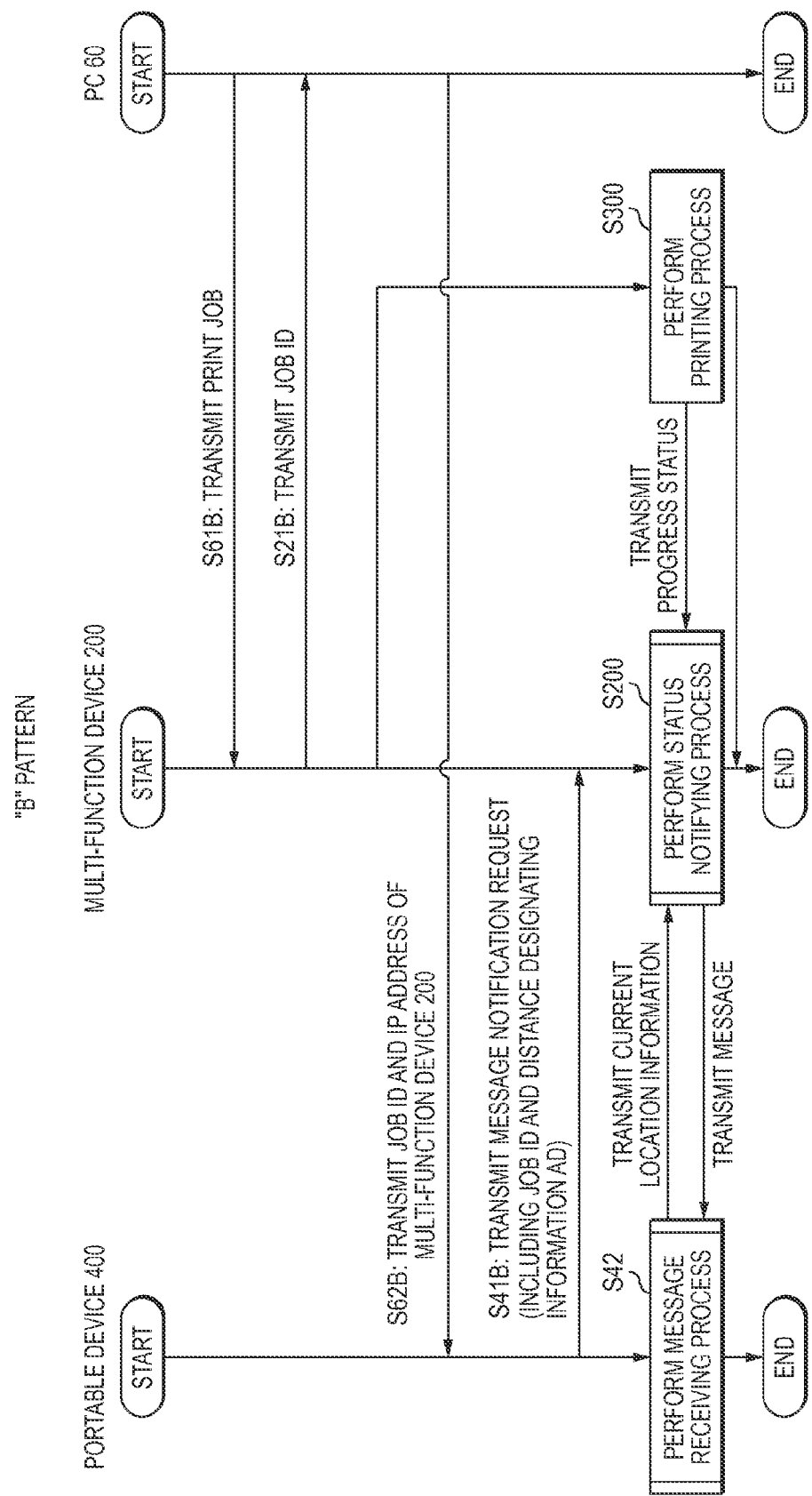

FIG. 7

COMPLETION PERIOD COMPUTING TABLE 223

| PRINTING OPTION | | | COMPLETION PERIOD Tf |
|---|---|---|---|
| NUMBER OF COLORS | RESOLUTION (dpi) | PAPER SIZE | |
| COLOR MODE | 300 | A4 | F1(PN) |
| | | B5 | F2(PN) |
| | | A3 | F3(PN) |
| | 600 | A4 | F4(PN) |
| | | B5 | F5(PN) |
| | | A3 | F6(PN) |
| | 1200 | A4 | F7(PN) |
| | | B5 | F8(PN) |
| | | A3 | F9(PN) |
| MONOCHROME MODE | 300 | A4 | F10(PN) |
| | | B5 | F11(PN) |
| | | A3 | F12(PN) |
| | 600 | A4 | F13(PN) |
| | | B5 | F14(PN) |
| | | A3 | F15(PN) |
| | 1200 | A4 | F16(PN) |
| | | B5 | F17(PN) |
| | | A3 | F18(PN) |

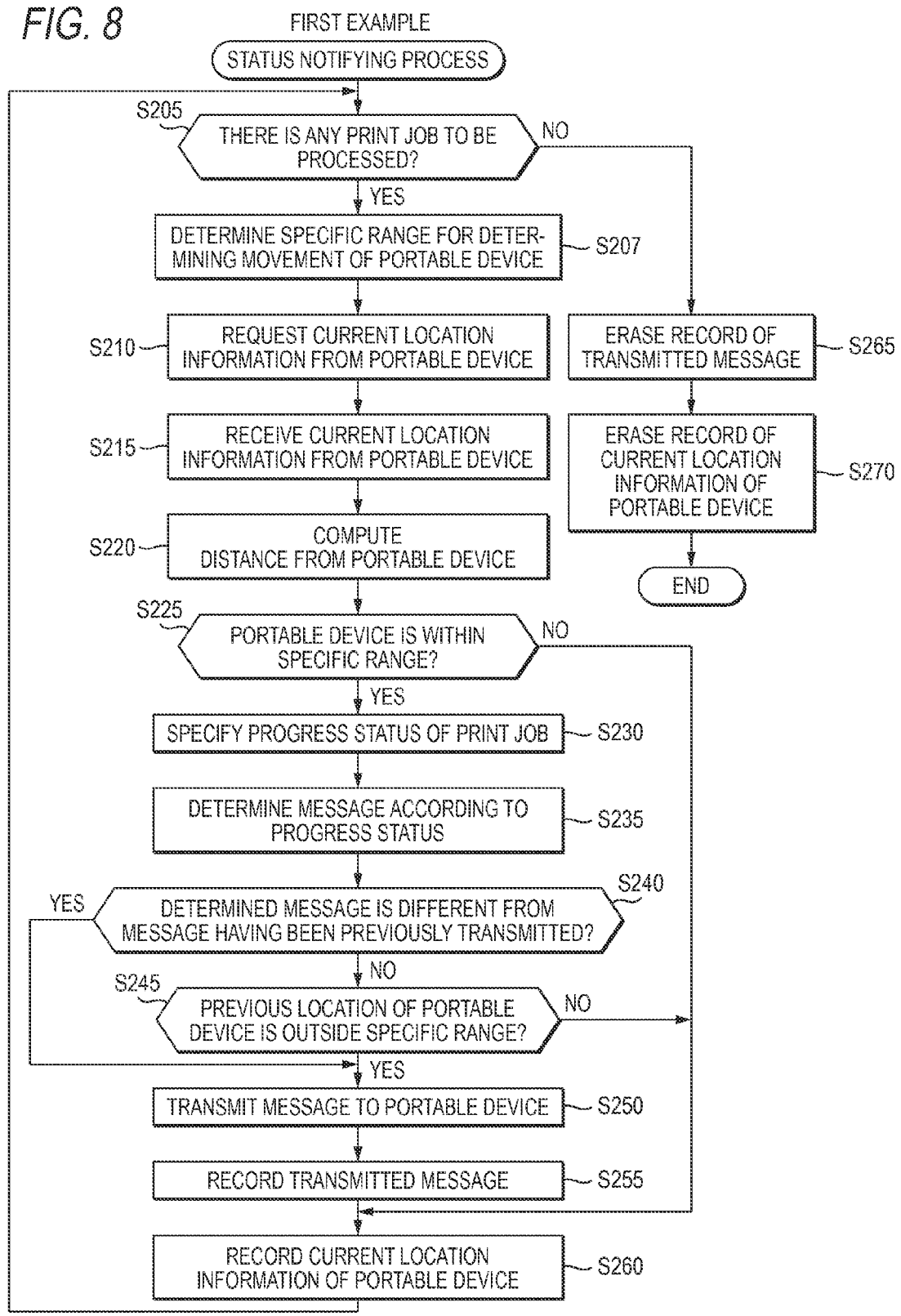

FIG. 9

MESSAGE TABLE 226

| | PROGRESS STATUS | | MESSAGE |
|---|---|---|---|
| ST1 | JOB RECEPTION WAITING STATE | | THERE IS NO JOB RECEIVED. |
| ST2 | PERFORMANCE WAITING STATE | | THE PRINTER OF WHICH YOU REQUIRED SECURE PRINTING IS CLOSE BY YOU. THE CURRENT OTHER JOB DOES NOT COMPLETE YET, AND THUS IT IS UNABLE TO START PRINTING NOW. PLEASE CHECK THE PRINTER AGAIN AFTER A LITTLE WHILE. |
| ST3 | PERFORMANCE START OPERATION WAITING STATE | | THE PRINTER OF WHICH YOU REQUIRED SECURE PRINTING IS CLOSE BY YOU. PLEASE TO TO THE PRINTER AND START PRINTING. |
| ST41 | IMAGE DEVELOPING STATE | | THE PRINTER OF WHICH YOU REQUIRED SECURE PRINTING IS CLOSE BY YOU. IT WILL TAKE SOME TIME FOR PRINTING TO COMPLETE. PLEASE CHECK THE PRINTER AGAIN. |
| ST42 | OUTPUTTING STATE | PRINTING COMPLETION PERIOD Tf IS LARGER THAN REFERENCE PERIOD TH | |
| | | PRINTING COMPLETION PERIOD Tf IS NOT LARGER THAN REFERENCE PERIOD TH | THE PRINTER OF WHICH YOU REQUIRED SECURE PRINTING IS CLOSE BY YOU. SINCE PRINTING IS EXPECTED TO FINISH SOON, PLEASE GO TO THE PRINTER AND COLLECT THE PRINTED MATTER. |
| ST43 | INTERRUPTED STATE | LACK OF PRINTING MATERIAL | THE PRINTER OF WHICH YOU REQUIRED SECURE PRINTING IS CLOSE BY YOU. THE TONER RAN OUT AND THUS IT IS IMPOSSIBLE TO CONTINUE PRINTING. PLEASE GO TO THE PRINTER AND REPLACE THE TONER. |
| | | LACK OF PAPER | THE PRINTER OF WHICH YOU REQUIRED SECURE PRINTING IS CLOSE BY YOU. THE PAPER RAN OUT AND THUS IT IS IMPOSSIBLE TO CONTINUE PRINTING. PLEASE GO TO THE PRINTER AND SUPPLEMENT PAPER. |
| | | PAPER JAM | THE PRINTER OF WHICH YOU REQUIRED SECURE PRINTING IS CLOSE BY YOU. A PAPER JAM OCCURRED AND THUS IT IS IMPOSSIBLE TO CONTINUE PRINTING. PLEASE GO TO THE PRINTER AND RELEASE THE ERROR. |
| STE | END STATE | JOB RECEPTION ERROR | IT WAS IMPOSSIBLE TO RECEIVE A JOB. |
| | | NON-RECOVERABLE STATE | THE PRINTER OF WHICH YOU REQUIRED SECURE PRINTING IS CLOSE BY YOU. A NON-RECOVERABLE ERROR OCCURRED AND THUS PRINTING WAS INTERRUPTED. PLEASE GO TO THE PRINTER AND CHECK THE ERROR. |
| | | NORMAL TERMINATION | THE PRINTER OF WHICH YOU REQUIRED SECURE PRINTING IS CLOSE BY YOU. SINCE PRINTING IS COMPLETED, PLEASE GO TO THE PRINTER AND COLLECT THE PRINTED MATTER. |
| | | CANCELLATION | THE PRINTER OF WHICH YOU REQUIRED SECURE PRINTING IS CLOSE BY YOU. YOUR PRINTING WAS CANCELED BY ANY OTHER USER. PLEASE CHECK THE PRINT JOB. |

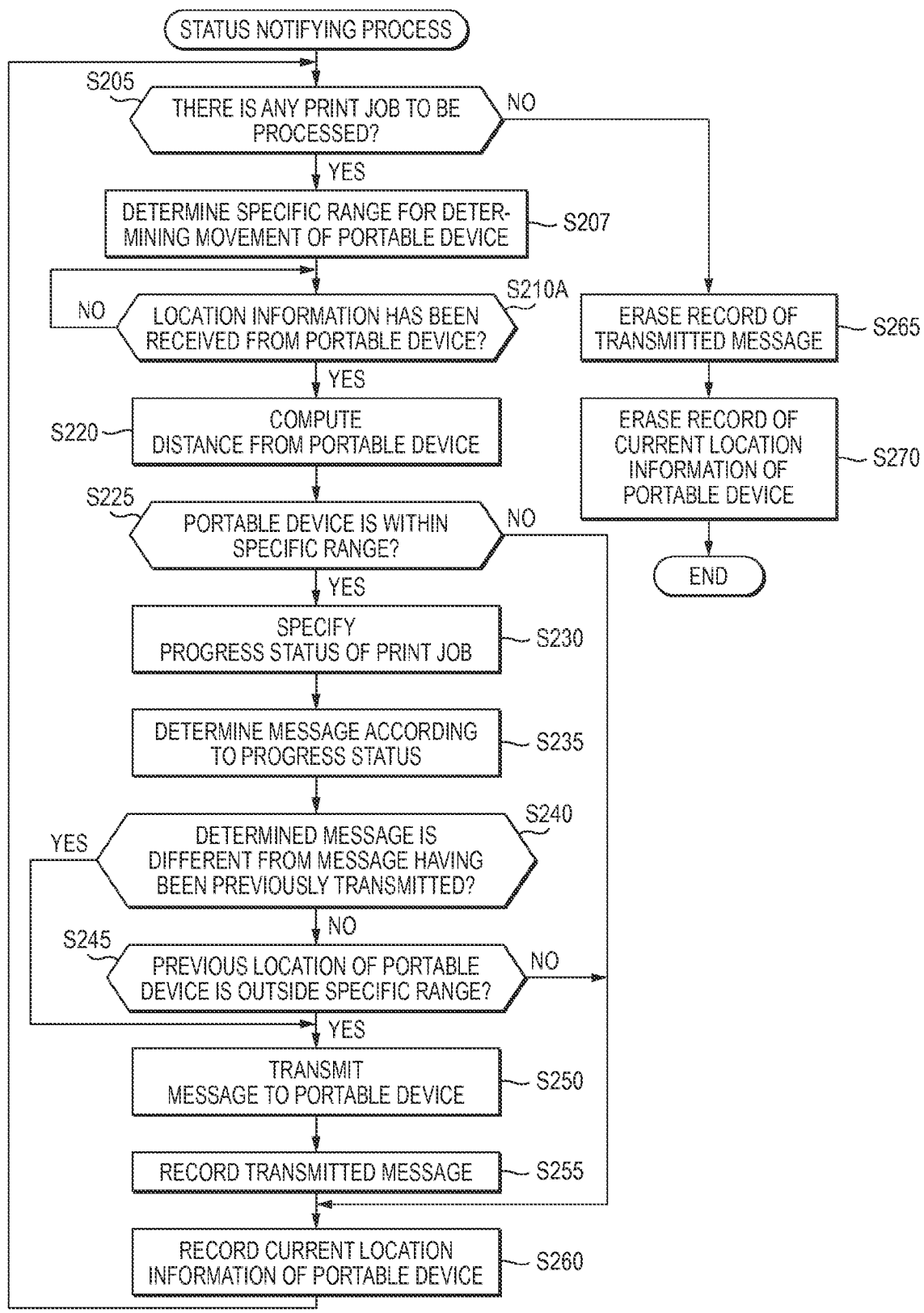

PRINTING APPARATUS

CROSS-REFERENCE TO RELATED APPLICATIONS

This application claims priority from Japanese Patent Application No. 2012-216763 filed on Sep. 28, 2012, the entire subject matter of which is incorporated herein by reference.

TECHNICAL FIELD

The present invention relates to a technology using wireless communication between a portable device and a printing apparatus for performing a printing process based on a print job.

BACKGROUND

Many printing apparatuses have communicating units capable of performing wireless communications (for example, wireless LANs and Bluetooth (which is a registered trademark)). For example, there has been disclosed a printing apparatus which determines whether a printed document is left on the printing apparatus or has been collected when a distance between the printing apparatus and a portable device of a user having performed printing is a predetermined value or less, and transmits a message according to the result of the determination to the portable device.

SUMMARY

Illustrative aspects of the present invention provide a technology to transmit appropriate information from a printing apparatus to a portable device, thereby improving convenience for a user.

According to one illustrative aspect of the present invention, there is provided a printing apparatus configured to perform wireless communication with a portable device, comprising: a network interface; a print execution unit; and a control device. The control device is configured to control the printing apparatus to operate as: a first receiving unit configured to receive a print job, wherein the print execution unit is configured to perform a printing process on the basis of the print job; a progress status specifying unit configured to specify a current progress status from among a plurality of progress statuses of the printing process including a first kind of progress status and a second kind of progress status; and a first transmitting unit configured to transmit a specific information to a portable device in a case where the portable device has moved into a specific range including the location of the printing apparatus, the specific information being for outputting a message according to the current progress status of the printing process, and the portable device being a transmission destination of information related to each progress status of the printing process. The first transmitting unit is configured to: transmit a first kind of specific information in a case where the current progress status is the first kind of progress status; and transmit a second kind of specific information different from the first kind of specific information in a case where the current progress status is the second kind of progress status.

BRIEF DESCRIPTION OF THE DRAWINGS

FIG. 3 is a second sequence diagram illustrating an outline of a printing operation of the system to perform printing;

FIG. 7 is a view illustrating an example of a completion period computing table;

FIG. 8 is a flow chart of a status notifying process according to a first example;

FIG. 9 is a view illustrating an example of a message table; and

FIG. 10 is a flow chart of a status notifying process according to a second example.

DETAILED DESCRIPTION

<General Overview>

Figure 1:
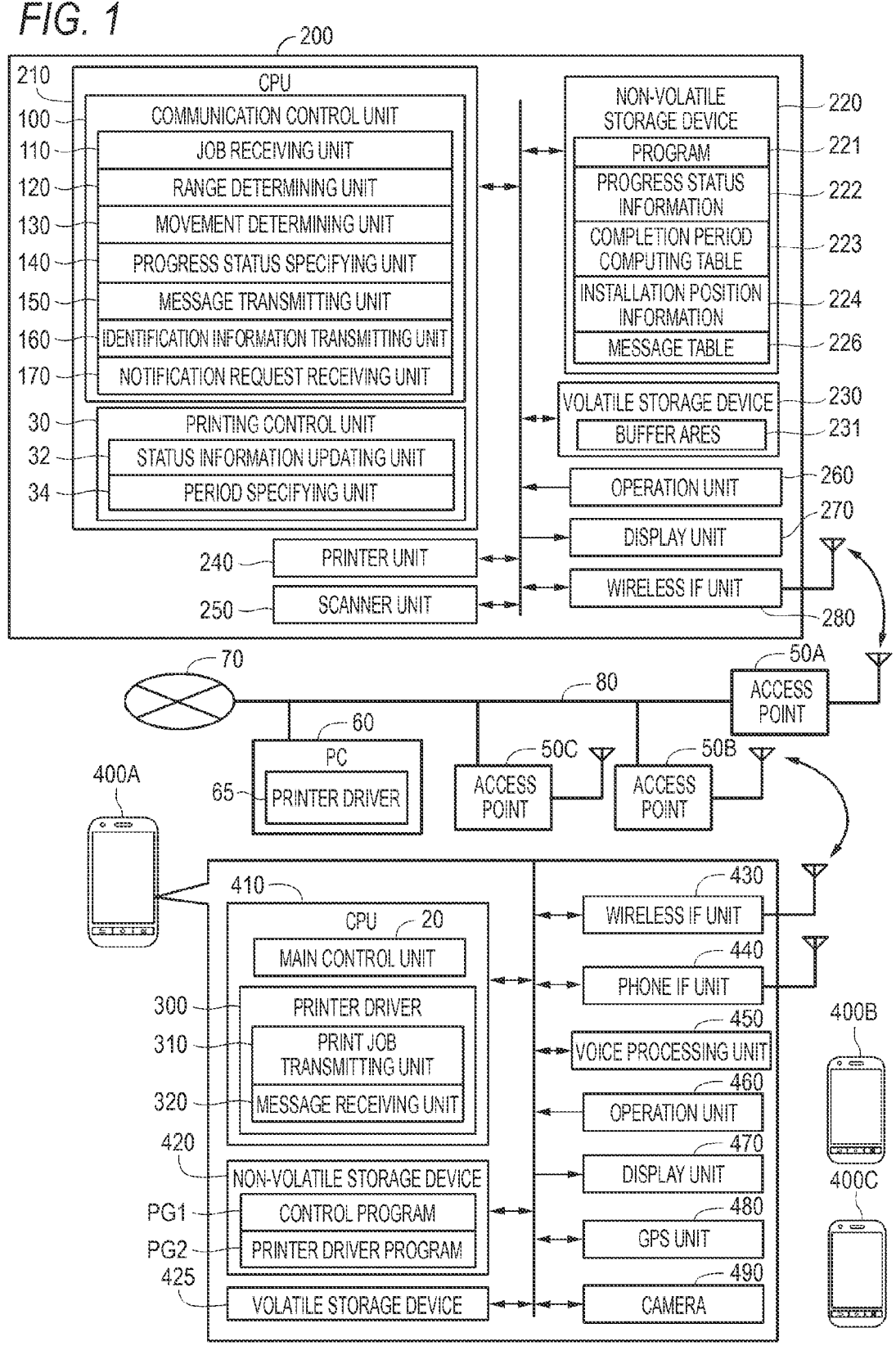
FIG. 1 is a block diagram illustrating the configuration of a system including a multi-function device as a printing apparatus according to an example.

The above-described related art may not sufficiently transmit appropriate information to the user through the portable device, so that it may not enough to be convenient for the user.

Therefore, illustrative aspects of the present invention provide a technology to transmit appropriate information from a printing apparatus to a portable device, thereby improving convenience for a user.

Illustrative aspects of the present invention can be implemented as the following examples.

(1) A printing apparatus configured to perform wireless communication with a portable device, comprises: a network interface; a print execution unit; and a control device. The control device is configured to control the printing apparatus to operate as: a first receiving unit configured to receive a print job, wherein the print execution unit is configured to perform a printing process on the basis of the print job; a progress status specifying unit configured to specify a current progress status from among a plurality of progress statuses of the printing process including a first kind of progress status and a second kind of progress status; and a first transmitting unit configured to transmit a specific information to a portable device in a case where the portable device has moved into a specific range including the location of the printing apparatus, the message-related information being for outputting a message according to the current progress status of the printing process, and the portable device being a transmission destination of information related to each progress status of the printing process. The first transmitting unit is configured to: transmit a first kind of specific information in a case where the current progress status is the first kind of progress status; and transmit a second kind of specific information different from the first kind of specific information in a case where the current progress status is the second kind of progress status.

According to the above-described configuration, in the portable device, a message according to the current progress status of a printing process is output at a timing when the portable device moves into the specific range. This message depends on the first kind of progress status and the second kind of progress status which are statuses of the printing process. Therefore, for example, according to the output message, the user can determine an action which is to be taken to acquire the document output by the printing process. Therefore, it is possible to improve convenience for the user.

(2) The printing apparatus according to (1), the control device is further configured to control the printing apparatus to operate as a movement determining unit configured to determine whether the portable device has moved into the specific range. After the print job is received by the first receiving unit, the movement determining unit is configured to periodically acquire location information representing the location of the portable device from the portable device. The movement determining unit is configured to determine whether the portable device has moved within the specific range on the basis of the location information representing the location of the portable device and location information of the printing apparatus. In a case where the location information of the portable device is acquired, when it is determined that the portable device has not moved within the specific range, the first transmitting unit is configured not to transmit the specific information to the portable device. In a case where the location information of the portable device has acquired, when it is determined that the portable device has moved within the specific range, the first transmitting unit is configured to transmit the specific information to the portable device.

According to the above-described configuration, the portable device needs only to periodically transmit location information to the printing apparatus. Therefore, it is possible to transmit information for displaying a message when the portable device moves into the specific range, without putting an excess load on the portable device.

(3) The printing apparatus according to (2), wherein after the print job is received by the first receiving unit, the movement determining unit is configured to periodically request the location information from the portable device so as to periodically acquire the location information from the portable device.

According to the above-described configuration, the portable device needs only to transmit location information to the printing apparatus in response to a request from the printing apparatus. Therefore, it is possible to transmit information for displaying a message when the portable device moves into the specific range, without putting an excess load on the portable device.

(4) The printing apparatus according to any one of (1) to (3), wherein the printing process comprises: a print data generating process of generating print data by use of image data that is included in the print job; and an outputting process of outputting a printed document by use of the print data. The first kind of progress status includes a status before the outputting process has completed. The second kind of progress status includes a status after the outputting process has completed.

According to the above-described configuration, since different messages are displayed before and after outputting of the printed document is completed, it is convenient for the user. For example, the user can appropriately determine a timing to go to the printing apparatus to get the printed document.

(5) The printing apparatus according to any one of (1) to (4), wherein the printing process comprises: a print data generating process of generating print data by use of image data that is included in the print job; and an outputting process of outputting a printed document by use of the print data. The first kind of progress status includes a status in which a completion period necessary to complete the outputting process is longer than a reference. The second kind of progress status includes a status in which the completion period is equal to or shorter than the reference.

According to the above-described configuration, since different messages are displayed on the portable device in response to completion periods necessary to complete outputting of printed documents, it is convenient for the user. For example, the user can more appropriately determine the timing to go to the printing apparatus to get a printed document.

(6) The printing apparatus according to (5), wherein the first receiving unit is configured to receive the print job that requests outputting of the printed document of a plurality of sheets. The control device is further configured to control the printing apparatus to operate as a period specifying unit configured to specify a unit period necessary for the printing process of a portion of the print job so as to specify the completion period on the basis of the unit period.

According to the above-described configuration, it is possible to accurately specify the completion period.

(7) The printing apparatus according to any one of (1) to (6), wherein the control device is further configured to control the printing apparatus to operate as: a second transmitting unit configured to transmit identification information for identifying the print job, to the source of the print job; and a second receiving unit configured to receive the identification information from the portable device. The progress status specifying unit is configured to specify the current progress status of the printing process based on the print job which is identified by the identification information received by the second receiving unit. The first transmitting unit is configured to transmit the specific information according to the current progress status to the portable device that is the source of the identification information.

According to the above-described configuration, it is possible to transmit information for displaying an appropriate message according to the progress status of a printing process to the portable device.

(8) The printing apparatus according to any one of (1) to (7), further comprising an operation unit configured to receive a user operation. The printing apparatus is configured to operate in a specific printing mode for requesting specific operation on the operation unit to start outputting a printed document on the basis of the print job. The first kind of progress status includes a status before the specific operation is received. The second kind of progress status includes a status after the specific operation is received. The first kind of specific information includes information for outputting an operation requesting message that is transmitted in a case where the current progress status in the specific printing mode is the status before the specific operation is received, the operation requesting message including message for requesting the specific operation.

According to the above-described configuration, in a case where the printing apparatus is operating in the specific printing mode, when the user is close to the printing apparatus, a message for requesting the specific operation is displayed on the portable device of the user. Therefore, it is convenient for the user.

(9) The printing apparatus according to any one of (1) to (8), wherein the control device is further configured to control the printing apparatus to operate as a range determining unit configured to determine the specific range for each portable device on the basis of range information for designating the specific range. In a case where a first portable device has moved into a first specific range, the first transmitting unit is configured to transmit the specific information according to the current progress status to the first portable device. In a case where a second portable device has moved into a second specific range, the first transmitting unit is configured to transmit the specific information according to the current progress status to the second portable device.

According to the above-described configuration, e a specific range is determined for each portable device, and a message is transmitted to each portable device. Therefore, it is possible to transmit information for displaying a message at an appropriate timing for each portable device.

(10) The printing apparatus according to any one of (1) to (9), wherein in a case where the portable device is within the specific range, when the message according to the current progress status changes in response to a change in the current progress status, the first transmitting unit is configured to transmit the specific information to the portable device.

According to the above-described configuration, for example, even for a case where the user stays in the specific range over a comparatively long period, when the progress status of the printing process changes and the message varies, a message according to the progress status of the printing process is transmitted to the portable device. As a result, the user can appropriately grasp the progress status of the printing process.

(11) The printing apparatus according to any one of (1) to (10), wherein the first kind of progress status includes a status in which the printing process is interrupted due to a specific error requiring a treatment on the printing apparatus by a user. The second kind of progress status includes a status in which the printing process is not interrupted. The first kind of specific information includes information for outputting a treatment requesting message that is transmitted in the status in which the printing process is interrupted, the treatment requesting message including message for requesting a treatment on the printing apparatus.

According to the above-described configuration, when the user is close to the printing apparatus in a situation where a printing process is interrupted, a message for requesting a treatment on the printing apparatus is displayed on the portable device of the user. Therefore, it is convenient for the user.

Incidentally, the present invention can be implemented in various forms such as control devices of printing apparatuses, computer programs for implementing the functions or methods of those devices, and computer-readable medium having the computer programs stored thereon.

Exemplary Embodiments

Exemplary embodiments will now be described in detail with reference to the drawings.

A. First Example

A-1. Configuration of System

FIG. 1 is a block diagram illustrating the configuration of a system including a multi-function device 200 as a printing apparatus according to an example. This system includes the multi-function device 200, a local area network (LAN) 80 connected to the Internet 70, a plurality of access points 50A to 50C connected to the LAN 80, a plurality of portable devices 400A to 400C, and a personal computer (PC) 60 connected to the LAN 80.

Each of the access points 50A to 50C is a wireless LAN router configured to function as an access point of a wireless LAN using a communication mode according to, for example, IEEE 802.11a/b/g/n standards. The multi-function device 200 and the portable devices 400A to 400C are able to perform wireless communication using an infrastructure mod, through the access points 50A to 50C. The infrastructure mode is a mode in which a plurality of wireless LAN terminal devices performs data communication through access points.

The LAN 80 is, for example, a wired network established in a structure (such as a building) on the basis of Ethernet (which is a registered trademark) standards. The access points 50A to 50C may be dispersively disposed in the structure and establish a wireless network. As a result, at an arbitrary place within the structure, the portable devices 400 are able to be connected to the LAN 80 through the wireless network.

The multi-function device 200 includes a CPU 210 (one example of a control device), a non-volatile storage device 220 such as a hard disk drive or a flash memory, a volatile storage device 230 such as a RAM, a printer unit 240 that is a print engine for printing images in a predetermined mode (such as an inkjet mode or a laser mode), a scanner unit 250 configured to optically read a document by use of an optical sensor (such as a contact image sensor (CIS)), an operation unit 260 such as a touch panel or buttons, a display unit 270 that includes a display panel such as a liquid crystal panel superimposed on a touch panel, and a wireless IF unit 280 that is an interface for performing data communication with an external device such as a personal computer or a portable device.

The volatile storage device 230 includes a buffer area 231 for temporarily storing various intermediate data which are generated when the CPU 210 performs processes. The non-volatile storage device 220 stores a computer program 221 for controlling the multi-function device 200, the completion period computing table 223, installation position information 224, and the message table 226.

The computer program 221 may be stored in the non-volatile storage device 220 in advance during shipment of the multi-function device 200. Further, the computer program 221 may be recorded in a CD-ROM or the like to be supplied, or may be downloaded from a server.

The completion period computing table 223 is a table in which print options (such as a resolution, a paper size, and the number of colors (for example, a color or monochrome mode) are associated with a time necessary from start to completion of a printing process.

The installation position information 224 is coordinate information representing the installation position of the multi-function device 200, which is three-dimensional coordinate information including values representing latitude, longitude, and altitude, respectively. The installation position information 224 may be two-dimensional coordinate information including values representing latitude and longitude, respectively. The installation position information 224 may be input through the operation unit 260 by a user. In other configurations, the multi-function device 200 may include a GPS receiver and may be configured to acquire the installation position information 224 on the basis of a GPS signal which is acquired by use of the corresponding GPS receiver.

The message table 226 (which will be described later) is a table in which progress statuses of a printing process and messages according to the corresponding progress statuses are recorded in association with each other.

The non-volatile storage device 220 stores progress status information 222 representing a progress status of a printing process (which will be described later) in the printing process. The progress status information 222 may be stored in the volatile storage device 230.

The CPU 210 is configured to execute the computer program 221 so as to control the entire multi-function device 200. Specifically, the CPU 210 functions not only as various functional units (not shown) for controlling components such as the scanner unit 250, but also as a printing control unit 30 for performing printing, and a communication control unit 100 for controlling communication processes including a status notifying process (which will be described later). The printing control unit 30 has a functional unit (not shown) for controlling the printer unit 240. In addition, the printing control unit 30 has a status information updating unit 32 for updating the progress status information 222 described above and a period specifying unit 34 for specifying a completion period necessary to complete printing (outputting of a printed document) in the middle of a printing process. The communication control unit 100 includes functional units 110 to 170 for performing a status notifying process, which will be described later. That is, the communication control unit 100 includes a job receiving unit 110, a range determining unit 120, a movement determining unit 130, a progress status specifying unit 140, a message transmitting unit 150, an identification information transmitting unit 160, and a notification request receiving unit 170. Specific processes which those functional units perform will be described later.

The wireless IF unit 280 includes an antenna and is configured to perform wireless communication, for example, through the access point 50A, that is, wireless communication based on the infrastructure mode. As will be described later, the wireless IF unit 280 may be used for data communications such as data communication with the portable devices 400A to 400C and data communication with the PC 60.

The portable device 400A is, for example, a multi-function mobile phone called a smart phone. The portable device 400A includes a CPU 410, a non-volatile storage device 420 such as a hard disk drive or a flash memory, a volatile storage device 425 such as a RAM, a wireless IF unit 430, a phone IF unit 440, a voice processing unit 450 for implementing various phone functions such as a speaker or a microphone, an operation unit 460 including a touch panel, operation keys, or the like, a display unit 470 including various components such as a liquid crystal panel superimposed on a touch panel, a GPS unit 480, and a camera 490 for performing imaging by use of an image sensor.

The wireless IF unit 430 includes an antenna and is configured to perform wireless communication, for example, through an access point 50, that is, wireless communication based on the infrastructure mode. As will be described later, the wireless IF unit 430 may be used to transmit print jobs to the multi-function device 200 and receive messages from the multi-function device 200, for example.

The phone IF unit 440 includes an antenna and is configured to perform wireless communication with a base station (not shown) on the basis of a portable phone communication mode (for example, W-CDMA). The phone IF unit 440 may be used, for example, for connection with a phone or the Internet 70 through a base station.

The GPS unit 480 includes a receiver configured to receive a radio wave (GPS signal) transmitted from a satellite constituting a global positioning system (GPS). The GPS unit 480 is able to acquire location information representing a current location on the basis of a received GPS signal. The location information is three-dimensional coordinate information including values representing latitude, longitude, and altitude, respectively. The location information may be two-dimensional coordinate information including values representing latitude and longitude, respectively.

The non-volatile storage device 420 stores a control program PG1 and a printer driver program PG2. The control program PG1 is a program for implementing basic functions of the portable device 400A such as an operating system (OS) function, a phone function, and a function of controlling the GPS unit 480 and the camera 490. The control program PG1 may be provided by the manufacturer of the portable device 400A and may be stored in advance before shipment. The printer driver program PG2 is a program for implementing a function for remotely operating the printer unit 240 of the multi-function device 200. The printer driver program PG2 is a program (also referred to as an application) for adding a new function to the portable device 400A and may be provided by a provider (for example, the manufacturer of the multi-function device 200) different from the manufacturer of the portable device 400A such that it is downloadable from a predetermined server. Incidentally, the printer driver program PG2 may be provided, for example, by the manufacturer of the portable device 400A and may be stored in advance during shipment.

The CPU 410 executes the control program PG1 so as to function as a main control unit 20 for implementing the basic functions of the portable device 400A. Further, the CPU 410 executes the printer driver program PG2 so as to function as a printer driver 300. The printer driver 300 includes a print job transmitting unit 310 for transmitting print jobs to the multi-function device 200, and a message receiving unit 320 for receiving messages according to progress statuses of a printing process from the multi-function device 200.

The other portable devices 400B and 400C have the same configuration as that of the above-described portable device 400A, and thus detailed descriptions will be omitted. Hereinafter, in a case where each of the portable devices 400A to 400C does not need to be distinguished, the alphabet at the end of its reference symbol is omitted such that it is also called a portable device 400.

The PC 60 is a known computing machine including a CPU, a storage unit such as a ROM, a RAM, or a hard disk, a keyboard, and a display (not shown). In the PC 60, a printer driver program is installed such that the PC 60 has a function as a printer driver 65.

A-2. Operation of System

Figure 2:
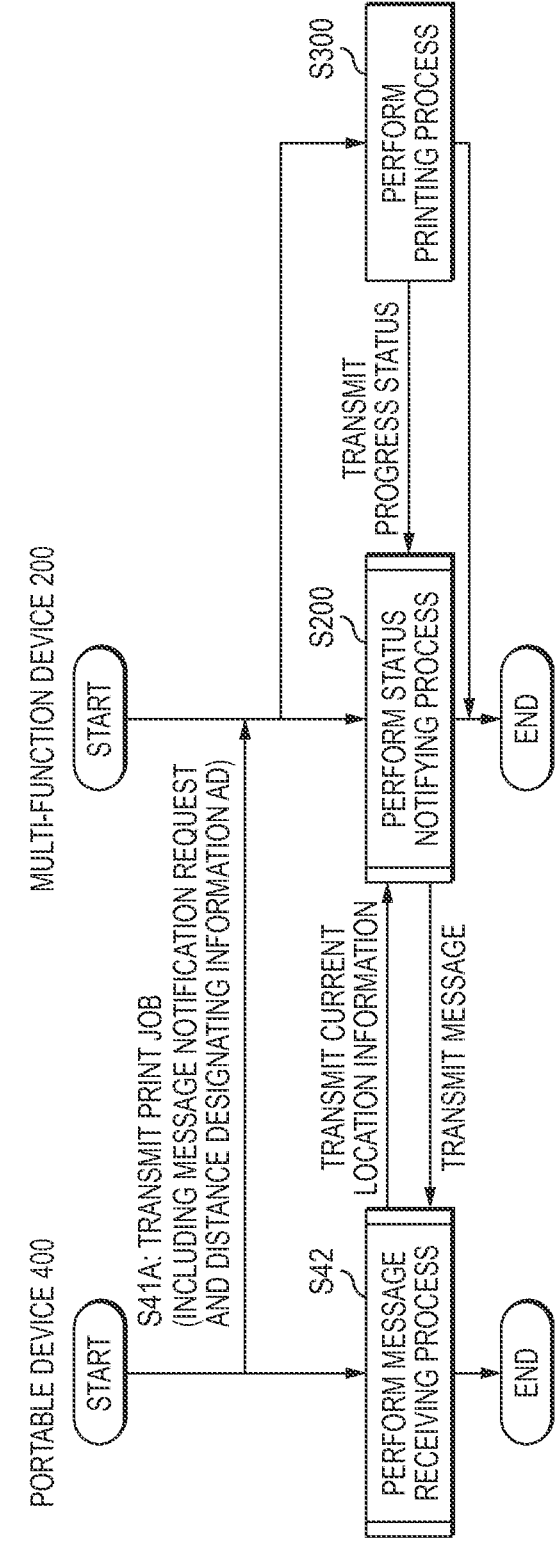
FIG. 2 is a first sequence diagram illustrating an outline of a printing operation of the system to perform printing.
Figure 4A:
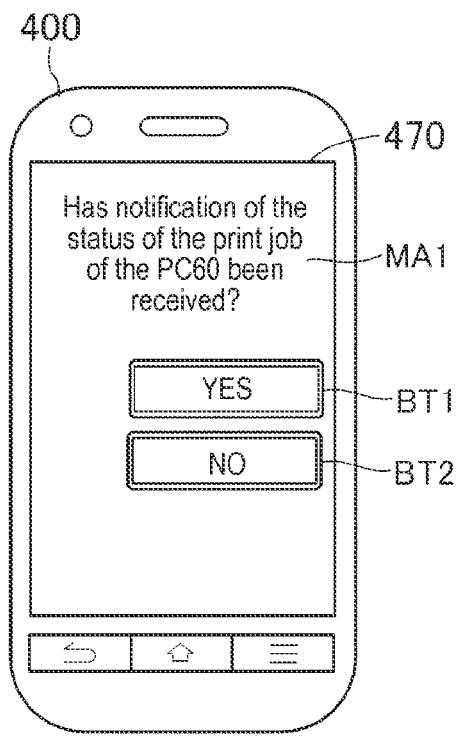
FIGS. 4A and 4B illustrate examples of a UI screen.
Figure 4B:
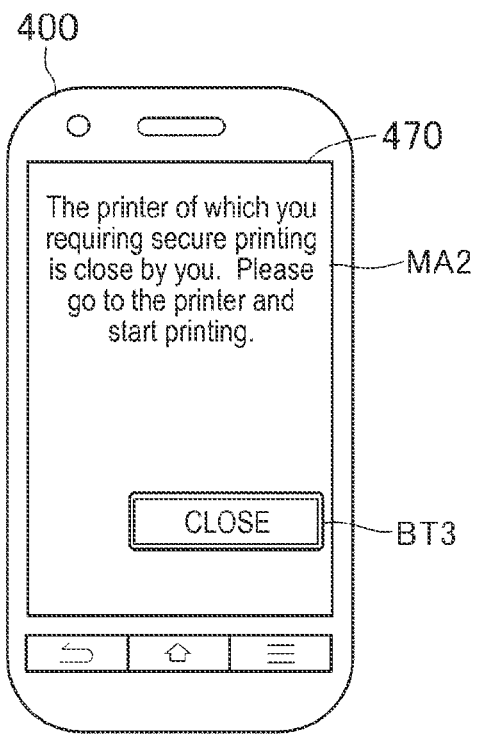

FIGS. 2 and 3 are sequence diagrams illustrating an outline of a printing operation of the system of FIG. 1 to perform printing. FIGS. 4A and 4B illustrate examples of a UI screen. The system of FIG. 1 is configured to operate in two patterns, that is, an "A" pattern shown in FIG. 2 and a "B" pattern shown in FIG. 3.

A-2-1: "A" Pattern

In the "A" pattern of FIG. 2, first, in STEP S41A, a print job is transmitted from a portable device 400 to the multi-function device 200. For example, the user of the portable device 400 operates the printer driver 300 of the portable device 400 to designate predetermined image data and issue a printing instruction. The print job transmitting unit 310 of the printer driver 300 generates a print job including not only the designated image data and various print commands (including commands for designation of a paper size, designation of the number of sheets to be printed, and so on), but also a message notification request and distance designating information AD. Further, the print job transmitting unit 310 transmits the corresponding print job to the multi-function device 200 through the wireless LAN. The distance designating information AD is information usable for a status notifying process, which will be described later.

The message notification request is data (such as a command) for requesting the multi-function device 200 to transmit a message according to a progress status of a printing process based on the print job. In other words, the message notification request is data for requesting the multi-function device 200 to perform a status notifying process (STEP S200) (which will be described later) in parallel with the printing process (STEP S300) based on the print job. The distance designating information AD is information which the range determining unit 120 refers to for determining a specific range in STEP S207 (FIG. 8) of the status notifying process (which will be described later). That is, the distance designating information AD is range information for designating the specific range. As will be described later, in the present example, the specific range is a sphere having a radius Rth from the multi-function device 200. Therefore, in the present example, the distance designating information AD is information designating the radius Rth. The radius Rth may be set to an appropriate value by the user, and may be set, for example, to about 3 m to 10 m.

The printer driver 300 of the portable device 400 may generate distance designating information AD to be transmitted, on the basis of an input from the user, and may acquire distance designating information AD which is a predetermined default. For example, the printer driver 300 displays candidates of distance designating information AD on a UI screen (not shown) (for example, a screen for receiving a print job transmission instruction) such that the candidates are selectable, or displays an input field for distance designating information AD, thereby receiving input of distance designating information AD from the user. Then, upon receiving input of distance designating information AD from the user, the printer driver 300 may generate distance designating information AD on the basis of the input from the user. On the other hand, if the printer driver 300 does not receive the input of distance designating information AD from the user, the printer driver 300 may acquire predetermined default distance designating information AD.

Upon receiving the print job including the message notification request, the multi-function device 200 stores the IP address of the source of the print job in association with the print job. As a result, the multi-function device 200 becomes able to transmit a request for current location information (which will be described later), and messages, to the portable device 400 which is the source of the print job. Further, upon receiving the print job including the message notification request, the multi-function device 200 performs a status notifying process (STEP S200) and a printing process (STEP S300) in parallel. Also, specifically, when the job receiving unit 110 (FIG. 1) of the communication control unit 100 receives the print job, the communication control unit 100 starts a status notifying process. Further, the printing control unit 30 receives the received print job, and starts a printing process based on the corresponding print job.

When the print job transmitting unit 310 of the portable device 400 transmits the print job, in STEP S42, the message receiving unit 320 of the printer driver 300 of the portable device 400 performs a message receiving process for receiving a message according to the progress status of a printing process from the multi-function device 200. The message receiving process includes a process of transmitting location information representing the current location of the portable device 400 to the multi-function device 200, and a process of receiving a message from the multi-function device 200 and displaying the corresponding message on the display unit 470 of the portable device 400.

A-2-2: "B" Pattern

In the "B" pattern of FIG. 3, first, in STEP S61B, a print job is transmitted from a printer driver 65 of the PC 60 to the multi-function device 200. In the present example, the print job which is transmitted from the PC 60 is a known print job, and the print job does not include the above-described distance designating information AD. When the multi-function device 200 (the job receiving unit 110 of the communication control unit 100) receives the print job, in STEP S21B, the identification information transmitting unit 160 (FIG. 1) of the communication control unit 100 transmits a job ID, which is identification information for identifying the print job, to the PC 60. Subsequently, the printing control unit 30 of the multi-function device 200 performs a printing process (STEP S300) based on the print job, like in the "A" pattern of FIG. 2.

Upon receiving the job ID, in STEP S62B, the printer driver 65 of the PC 60 transmits the job ID and the IP address of the multi-function device 200 to the portable device 400. A portable device 400 which is a transmission destination may be designated, for example, by the user of the PC 60. For example, when receiving a print job transmission instruction, the printer driver 65 displays a predetermined UI screen (not shown) and receives input of the IP address of a portable device 400 from the user. The printer driver 65 sets the input IP address of the portable device 400 as a transmission destination and transmits the job ID and the IP address of the multi-function device 200. Incidentally, as a modification, the printer driver 65 may present information including the job ID and the IP address of the multi-function device 200 directly to the user. Specifically, the printer driver 65 may display a uniform resource locator (URL) having the job ID and the IP address of the multi-function device 200 embedded therein, on a display of the printer driver 65.

Upon receiving the job ID and the IP address of the multi-function device 200, in STEP S41B, the message receiving unit 320 of the portable device 400 transmits a message notification request to the multi-function device 200. For example, upon receiving the job ID and the IP address of the multi-function device 200, the message receiving unit 320 displays a UI screen shown in FIG. 4A on the display unit 470 of the portable device 400. This UI screen includes; a message MA1 for prompting determination on whether to receive a message according to the progress status of the print job and transmitted from the PC 60; and buttons BT1 and BT2 for receiving the corresponding determination. In a case where it is determined to receive the message, the message receiving unit 320 transmits the message notification request to the multi-function device 200. Alternatively, in a case of receiving the job ID and the IP address of the multi-function device 200, the message receiving unit 320 may automatically transmit the message notification request to the multi-function device 200, without displaying that UI screen. Incidentally, in a case where the uniform resource locator (URL) having the job ID and the IP address of the multi-function device 200 embedded therein is presented directly to the user like in the above-described modification, the portable device 400 may receive input of the corresponding URL from the user, and use the corresponding URL to access the multi-function device 200, thereby making the message notification request to the multi-function device 200.

As the transmission destination of the message notification request, the IP address acquired from the PC 60 in STEP S62B is designated. The message notification request may include the job ID acquired from the PC 60 in STEP S62B and distance designating information AD. In the multi-function device 200, the notification request receiving unit 170 of the communication control unit 100 receives the message notification request from the multi-function device 200. Upon receiving the message notification request, the communication control unit 100 stores the IP address of the source (the portable device 400) of the message notification request in association with the job ID. As a result, the multi-function device 200 becomes able to transmit a request for current location information (which will be described later) and a message to the portable device 400 which is the source of the message notification request. Further, upon receiving the message notification request, in STEP S200, the communication control unit 100 starts a status notifying process. Further, upon receiving the message notification request, the message receiving unit 320 of the portable device 400 performs a message receiving process in STEP S42.

Incidentally, the status notifying process and printing process of the multi-function device 200 and the message receiving process of the portable device 400 are basically the same processes between the "A" pattern and the "B" pattern. Hereinafter, these processes will be further described.

A-2-3: Printing Process

Figure 5:
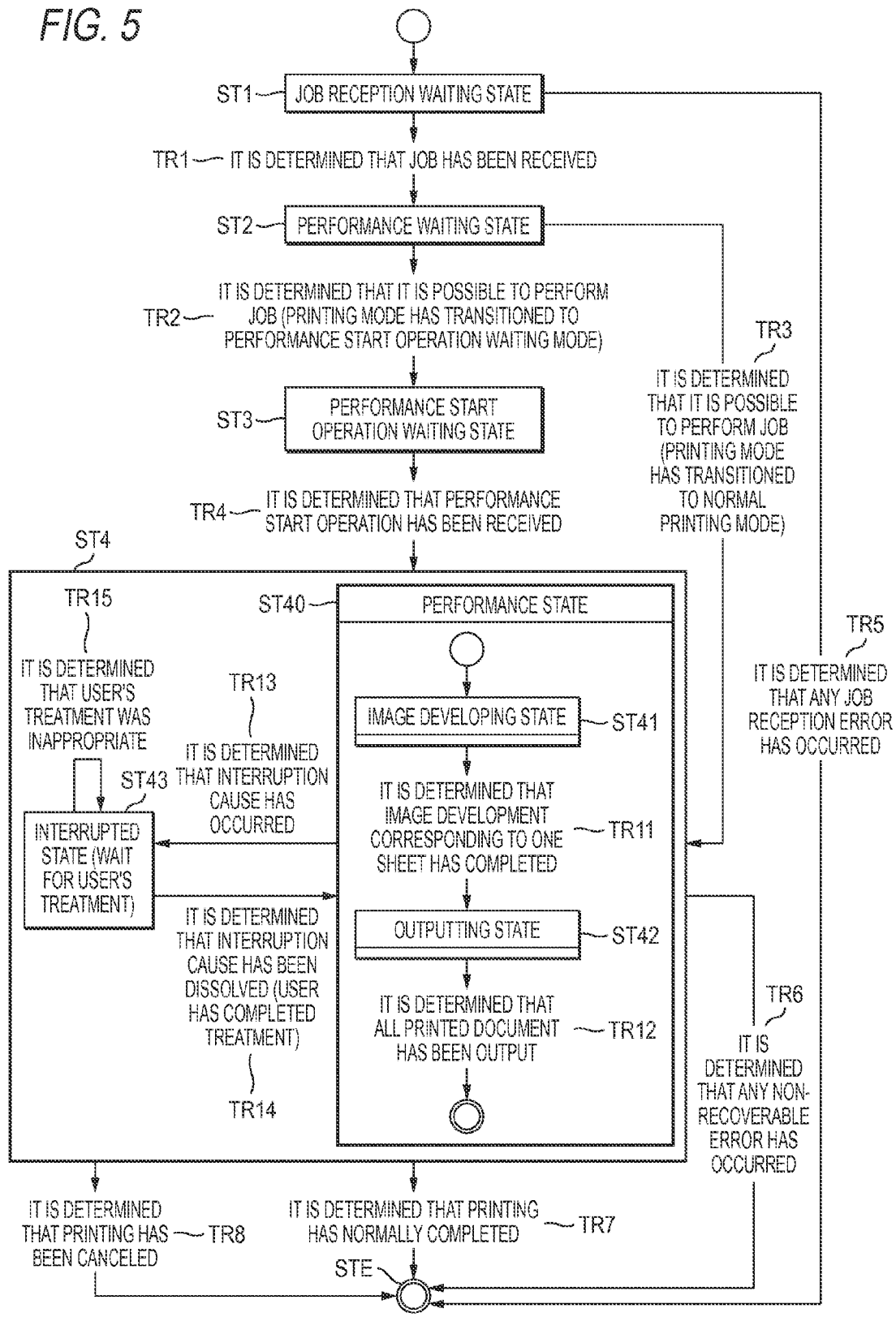
FIG. 5 is a state transition diagram illustrating a printing process.

FIG. 5 is a state transition diagram illustrating a printing process. First, state transition of a printing process by the printing control unit 30 and the printer unit 240 from when a print job is received to when a printed document is output on the basis of the print job will be described. The printing control unit 30 and the printer unit 240 may also be collectively referred to as a print execution unit. The print execution unit can simultaneously take a plurality of states corresponding to a plurality of print jobs. For example, even in a state where the print execution unit is performing printing based on one print job, the print execution unit is able to receive other print jobs. Nevertheless, in order to avoid complexity, state transition focusing on one print job will be described here.

A state ST1 of FIG. 5 is a state in which the print execution unit (the printing control unit 30) waits for a print job to be received (a job reception waiting state ST1). When a print job is received in the job reception waiting state ST1 in STEP TR1, the print execution unit transitions to a state in which it waits for a printing process based on the corresponding print job to be performed (a performance waiting state ST2). When it becomes possible to perform a printing process based on the print job in the performance waiting state ST2 in STEPS TR2 and TR3, that is, when a printing process based on a print job received prior to the print job received in STEP TR1 completes, the print execution unit transitions to a performance start operation waiting state ST3 or a printing process state ST4. That is, in a case where a printing mode is a performance start operation waiting mode, the print execution unit transitions to the performance start operation waiting state ST3, and in a case where the printing mode is a normal printing mode, the print execution unit transitions to the printing process state ST4.

Here, the performance start operation waiting mode is a printing mode to request specific operation on the operation unit 260 for a printing process (outputting of a printed document), that is, a printing mode in which a printing process does not start until the user performs the specific operation. The specific operation on the operation unit 260 includes, for example, pushing a predetermined button (such as a start button), bringing a contactless IC card or a device having a near field communication (NFC) function (such as a portable device) close to a reading unit (not shown) of the operation unit 260, etc. In the present example, a description will be made on the assumption that the performance start operation waiting mode is, for example, a printing mode (also referred to as a secure mode) to allow the user to input identification information such as a password, prior to a printing process, in order for suppressing theft of the printed document or the like. On the other hand, the normal printing mode is a printing mode in which the specific operation on the operation unit 260 is not required for a printing process (outputting of a printed document).

When performance start operation is received in the performance start operation waiting state ST3 in STEP TR4, the print execution unit transitions to the printing process state ST4. As can be understood from the above description, the performance start operation waiting state ST3 is an example of a status before the specific operation is received, and the printing process state ST4 is an example of a status after the specific operation is received.

The printing process state ST4 includes a performing state ST40 and an interrupted state ST43. When the print execution unit transitions to the printing process state ST4, in a case where any interruption cause does not occur, the print execution unit transitions to the performing state ST40, and in a case where an interruption cause occurs, the print execution unit transitions to the interrupted state ST43. Here, interruption causes include specific interruption causes requiring the user to perform a treatment on the multi-function device 200, specifically, a paper jam, lack of a printing material (such as toner or ink), and lack of paper. If an interruption cause occurs in the performing state ST40 in STEP TR13, the print execution unit transitions to the interrupted state ST43. When the interruption cause is dissolved in the interrupted state ST43 in STEP TR14, that is, when a treatment by the user for dissolving the interruption cause is completed, the print execution unit transitions to the performing state ST40. Even in a case where the user has performed the treatment in the interrupted state ST43, if it is determined in STEP TR15 that the treatment is inappropriate, the print execution unit is maintained in the interrupted state ST43. Here, the treatment performed by the user includes, for example, paper supplement, replacement of a printing material container (such as a toner cartridge or an ink cartridge), removal of jammed paper, etc. As can be understood from the above description, the interrupted state ST43 is an example of a status in which the printing process is interrupted, and the performing state ST40 is an example of a status in which the printing process is not interrupted.

The performing state ST40 includes an image developing state ST41 and an outputting state ST42. When the print execution unit transitions to the performing state ST40, first, the print execution unit becomes the image developing state ST41. The image developing state ST41 is a state in which the print execution unit (the printing control unit 30) is performing a print data generating process of generating print data using image data included in the print job. The print data generating process includes, for example, a rasterizing process, a color converting process, and a halftone process. The rasterizing process is a process of converting the image data included in the print job (for example, image data described in a PDL, or image data compressed in a JPEG format) into bitmap data (specifically, RGB image data). The color converting process is a process of converting the RGB image data into image data of a color system corresponding to colors of printing materials (specifically, CMYK image data). The halftone process is a process of converting the CMYK image data into dot data representing a dot formation state for each component and for each pixel (for example, binary image data) by use of a dither method or an error diffusion method.

The outputting state ST42 is a state in which the print execution unit (the printer unit 240) is performing an outputting process of outputting a printed document by use of the print data. That is, in a case where the printer unit 240 is a laser type print engine, the outputting process includes an exposing process, a developing process, a transferring process, and a fixing process.

If it is determined in STEP TR11 that image development corresponding to one sheet has completed in the image developing state ST41, that is, if print data corresponding to one sheet is generated, the print execution unit transitions to the outputting state ST42. Actually, in the present example, after image development corresponding to one sheet completes, image development (generation of print data) by the printing control unit 30 and outputting of the printed document by the printer unit 240 are performed in tandem (in parallel). However, in the present example, after the outputting of the printed document starts, a message representing the start of the outputting of the printed document is transmitted. Therefore, after the outputting of the printed document starts, it is determined that the state of the print execution unit is the outputting state ST42, regardless of whether image development is being performed in parallel with the outputting of the printed document. Incidentally, a case where image development (generation of print data) by the printing control unit 30 and outputting of the printed document by the printer unit 240 are sequentially performed unlike the present example will also be described. In this case, when all image development completes in the image developing state ST41, that is, when all print data based on the print job is generated, the print execution unit transitions to the outputting state ST42. The image developing state ST41 and the outputting state ST42 are examples of a status before the outputting process completes.

When it is determined in STEP TR12 that all printed document has been output in the outputting state ST42, the performing state ST40 becomes a termination state. In this case, since it is determined in STEP TR7 that the printing process has normally completed, the print execution unit transitions from the printing process state ST4 to an end state STE. The end state STE which the print execution unit transitions to since the printing process (outputting process) has normally completed is an example of a status after the outputting process is completed.

Further, if it is determined in STEP TR8 that an instruction for canceling performance of the printing has received through the operation unit 260 in the printing process state ST4, the print execution unit transitions to the end state STE. Further, if it is determined in STEP TR6 that a non-recoverable error has occurred in the printing process state ST4, the print execution unit transitions to the end state STE. As the non-recoverable error, a serious failure of the print execution unit, loss of the data of the print job attributable to a breakout or the like, and so on may be considered.

Further, if it is determined in STEP TR5 that a print job reception error has occurred in the job reception waiting state ST1, the print execution unit transitions to the end state STE. As the print job reception error, for example, an error in which the multi-function device 200 couldn't receive the entire print job due to a communication failure, and the like may be considered.

The states ST2 to ST4 and ST40 to ST43 of the print execution unit after the above-described print job is received until the print execution unit becomes the end state STE are recorded as the progress statuses of the printing process based on the print job, in the progress status information 222. Here, in a case where the print execution unit is in the interrupted state ST43, the interruption cause (lack of paper, a paper jam, or lack of a printing material) is recorded together with the progress status in the progress status information 222. Also, in a case where the print execution unit is in the end state STE, a cause resulting in the transition to the end state STE (specifically, normal termination in STEP TR7, cancellation of performance in STEP TR8, a non-recoverable error in STEP TR6, or a job reception error in STEP TR5) is recorded together with the progress status in the progress status information 222. That is, the status information updating unit 32 of the printing control unit 30 updates the progress status information 222 whenever the state of the print execution unit transitions such that it is possible to specify the progress status of the printing process with reference to the progress status information 222.

Here, in a case where the print execution unit is in the printing process state ST4, the period specifying unit 34 of the printing control unit 30 performs a completion period specifying process of specifying a completion period necessary to complete the process of outputting the printed document.

Figure 6:
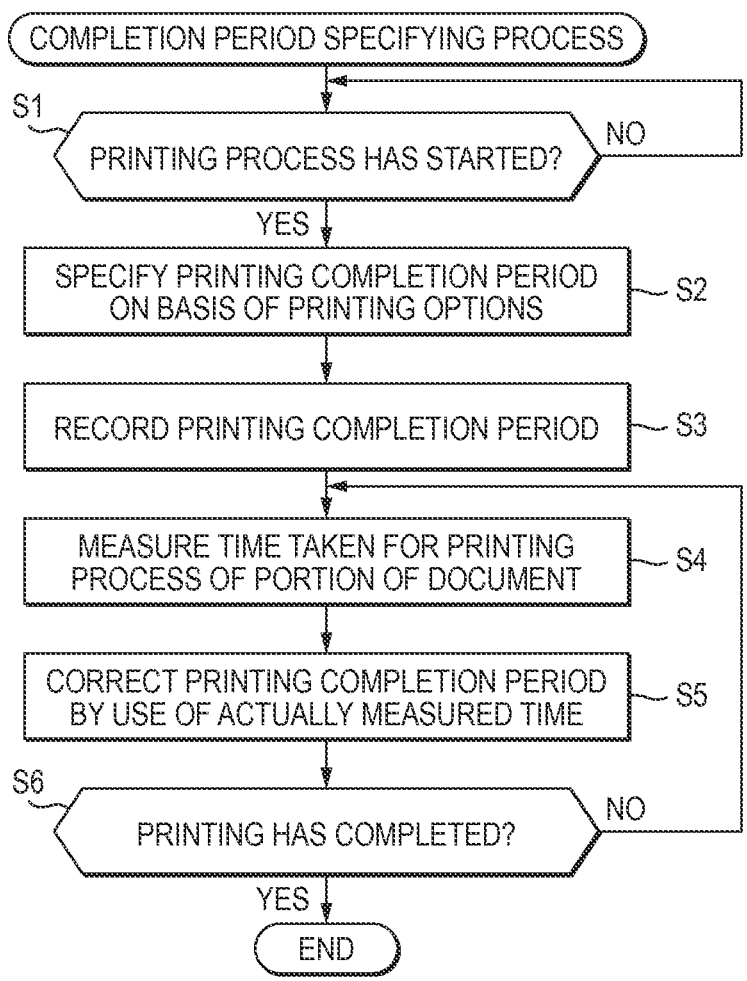
FIG. 6 is a flow chart of a completion period specifying process.

FIG. 6 is a flow chart of the completion period specifying process.

In STEP S1, the period specifying unit 34 determines whether the printing process based on the print job has started, that is, whether the print execution unit is in the printing process state ST4 with respect to the target print job. In a case where the printing process based on the print job has not started (NO in STEP S1), the period specifying unit 34 waits for the printing process to start. In a case where the printing process based on the print job has started (YES in STEP S1), in STEP S2, the period specifying unit 34 specifies a printing completion period Tf on the basis of printing options.

FIG. 7 is a view illustrating an example of the completion period computing table 223. In this example, a function Fn(PN) (where n is an integer which is 1 or more and 18 or less in the example of FIG. 7) which takes the number PN of sheets to be printed, as an argument, and computes a printing completion period Tf is associated with a combination of the number of colors (for example, a color or monochrome mode), a resolution (which is expressed in dpi (dots per inch), and a paper size (for example, A4, B5 or A3). The period specifying unit 34 is able to compute the printing completion period Tf based on the printing options, with reference to the completion period computing table 223.

In STEP S3, the period specifying unit 34 records the printing completion period Tf specified in STEP S2, in the progress status information 222. The printing completion period Tf recorded in the progress status information 222 is updated by a timer, and the printing completion period Tf can be specified with reference to the progress status information 222 at an arbitrary timing in the middle of the printing process.

In STEP S4, the period specifying unit 34 measures a time taken for the printing process of a portion of the document to be output. For example, in the present example, whenever outputting of the printed document corresponding to one sheet is completed, the actually measured time taken from the start of the printing process is specified. In STEP S5, the actually measured time taken for the printing process of a portion of the document to be output is used to correct the printing completion period Tf recorded in the progress status information 222. For example, in a case where an actually measured time up to page 5 is specified, the period specifying unit 34 computes a time necessary for printing up to page 5 on the basis of the printing options, with reference to the completion period computing table 223, and compares the computed time with the actually measured time. Then, a difference (a delay or a progress) between the actually measured time and the necessary time obtained with reference to the completion period computing table 223 is used to correct the printing completion period Tf recorded in the progress status information 222. For example, the period specifying unit 34 may correct the printing completion period Tf by simply adding the delay time to the printing completion period Tf or subtracting the progress time from the printing completion period Tf. Incidentally, in a case where image development (generation of print data) and outputting of the printed document are alternately repeated one sheet by one sheet (a serial process), the period specifying unit 34 may set a value obtained by multiplying an actually measured time taken for the printing process corresponding to one sheet, by the number PN of sheets to be printed, as the printing completion period Tf.

In STEP S6, the period specifying unit 34 determines whether the printing process has completed, that is, whether all of the printed document based on the print job have been output. In a case where the printing process has not completed (NO in STEP S6), the period specifying unit 34 returns to STEP S4 to repeat measurement of a time taken for the printing process of a portion of the document (STEP S4) and correction of the printing completion period Tf using the actually measured time (STEP S5). In a case where the printing process has completed (YES in STEP S6), the period specifying unit 34 finishes the completion period specifying process.

The completion period specifying process as described above can be performed such that it is possible to record an accurate printing completion period Tf in the progress status information 222 at an arbitrary timing in the middle of the printing process. Incidentally, a delay of the printing process may occur in some cases, for example, in Case 1 where it takes a long time to receive a print job due to network congestion in some cases such as a case where the amount of the data of the print job is large, and thus it is necessary to receive the print job over a plurality of times in the middle of the printing process, and in Case 2 where the printing process is delayed since the multi-function device 200 performs another process (such as a process of controlling a scanner, or a process of receiving a facsimile or the like) in parallel with the printing process. A progress of the printing process may occur in some cases, for example, a case where print images are simple, and a case where a time necessary for generation of print data or the like is shorter than an expected time.

A-2-4: Status Notifying Process and Message Receiving Process

Subsequently, the specific contents of the status notifying process (FIGS. 2 and 3), which is performed by the communication control unit 100 of the multi-function device 200, will be described. In addition, the contents of the message receiving process, which is performed in response to the status notifying process by the message receiving unit 320 of the portable device 400, will be described.

FIG. 8 is a flow chart of a status notifying process according to a first example.

When the status notifying process starts, in STEP S205, the communication control unit 100 determines whether there is any print job to be processed. A print job to be processed is a print job which needs to notify the portable device 400 of a message according to a progress status by the status notifying process. Specifically, in case of the "A" pattern (FIG. 2), the print job, transmitted from the portable device 400 in STEP S41A, is a print job to be processed. Further, in case of the "B" pattern (FIG. 3), the print job which is specified by the job ID included in the message notification request which is transmitted from the portable device 400 in STEP S41B is a print job to be processed. Even in a case where the multi-function device 200 uses the job ID to receive a plurality of print jobs, the communication control unit 100 is able to easily specify a print job to be a target of a message notification request.

In a case where there is a print job to be processed (YES in STEP S205), in STEP S207, the range determining unit 120 of the communication control unit 100 determines a specific range for determining movement of a portable device 400 on the basis of distance designating information AD corresponding to the print job to be processed. In the present example, the specific range is a sphere having a radius Rth from the multi-function device 200, and the value of the radius Rth is designated by the distance designating information AD. The value of the radius Rth may be set to an appropriate value by the user, and may be set, for example, to about 3 m to 10 m. Like this, in STEP S207, a specific range for determining movement of each portable device 400 is determined for each portable device 400 and for each print job.

Next, in STEP S210, the movement determining unit 130 of the communication control unit 100 requests current location information from a portable device 400 which is a transmission destination of messages related to the progress status of a printing process based on the corresponding print job. In the case of the "A" pattern (FIG. 2), the portable device 400 which is the transmission destination of messages is the portable device 400 which is the source of the print job. Also, in the case of the "B" pattern (FIG. 3), the portable device 400 which is the transmission destination of messages is the portable device 400 which is the source of the message notification request. In the following description of the status notifying process, when is simply called the portable device 400, it indicates the portable device 400 which is the transmission destination of messages in the status notifying process.

Upon receiving a request for the current location information, the message receiving unit 320 of the portable device 400 controls the GPS unit 480 to acquire the current location information representing the current location of the portable device 400. In response to the request for the current location information, the message receiving unit 320 transmits the acquired current location information to the multi-function device 200. As a result, in STEP S215, the movement determining unit 130 receives the current location information from the portable device 400.

In STEP S220, the movement determining unit 130 computes a current distance RS between the portable device 400 and the multi-function device 200, on the basis of the current location information of the portable device 400 and the installation position information 224 (FIG. 1) representing the installation position of the multi-function device 200. When the distance RS is computed, in STEP S225, the movement determining unit 130 determines whether the portable device 400 is located within the specific range determined in STEP S207. In the present example, the movement determining unit 130 compares the radius Rth determined in STEP S207 with the distance RS computed in STEP S220. In a case where the distance RS is larger than the radius Rth, the movement determining unit 130 determines that the portable device 400 is not located within the specific range, and in a case where the distance RS is equal to or smaller than the radius Rth, the movement determining unit 130 determines that the portable device 400 is located within the specific range.

In the case where the portable device 400 is not located within the specific range (NO in STEP S225), the communication control unit 100 transitions to the process of STEP S260. That is, in the case where the portable device 400 is not located within the specific range, transmission of a message to the portable device 400 is not performed. On the other hand, in the case where the portable device 400 is located within the specific range (YES in STEP S225), in STEP S230, the progress status specifying unit 140 refers to the progress status information 222 and specifies the current progress status of the printing process based on the print job to be processed. Subsequently, in STEP S235, the communication control unit 100 determines a message to be transmitted to the portable device 400, according to the specified progress status. In the present example, the communication control unit 100 determines a message according to the specified progress status, with reference to the message table 226.

FIG. 9 is a view illustrating an example of the message table 226 (FIG. 1). In the above-described STEP S230, the progress status specifying unit 140 specifies one progress status of a plurality of progress statuses of the printing process described in the left cells of the message table 226, on the basis of the state of the print execution unit recorded in the progress status information 222 (FIG. 5) or the printing completion period Tf. For example, each of the performance waiting state ST2 and the performance start operation waiting state ST3 is one progress status. Here, the outputting state ST42 is divided into two different progress statuses, that is, a status in which the printing completion period Tf is longer than a reference period TH, and a status in which the printing completion period Tf is equal to or shorter than the reference period TH. Also, the interrupted state ST43 is divided into three different progress statuses (interruption attributable to lack of a printing material, interruption attributable to lack of paper, and interruption attributable to a paper jam) according to interruption causes. Further, the end state STE is divided into four different progress statuses (a job reception error, impossibility of recovery, normal termination, and cancellation) according to causes of transition to the end state STE. In the example of FIG. 9, in STEP S230, any one progress status of 13 progress statuses is specified.

Then, in the above-described STEP S235, a message associated with the progress status specified in STEP S230 in the message table 226 is selected from the message table 226. As shown in FIG. 9, for example, the performance waiting state ST2 is associated with a message describing that the printing process based on the print job has not started and a long time is necessary to complete the printing process. Further, the performance start operation waiting state ST3 is associated with an operation requesting message for requesting the user to operate the operation unit 260 for starting the printing process. Further, the image developing state ST41 is associated with a message describing that a time necessary to complete the printing process is comparatively long. Further, of the outputting state ST42, the status in which the printing completion period Tf is longer than the reference period TH, and the status in which the printing completion period Tf is equal to or shorter than the reference period TH are associated with different messages, respectively. That is, the status in which the printing completion period Tf is longer than the reference period TH is associated with a message describing that a time necessary to complete the printing process is comparatively long, and the status in which the printing completion period Tf is equal to or shorter than the reference period TH is associated with a message describing that a time necessary to complete the printing process is comparatively short. In the example of FIG. 9, the image developing state ST41 and the status which is included in the outputting state ST42 and in which the printing completion period Tf is longer than the reference period TH may be associated with the same message. Alternatively, in a modification, those two statuses are associated with different messages, respectively. For example, the image developing state ST41 is associated with a message representing that a period is longer than that in the status which is included in the outputting state ST42 and in which the printing completion period Tf is longer than the reference period TH.

Further, according to each interruption cause, the interrupted state ST43 is associated with a treatment requesting message for requesting the user to perform a treatment (a treatment for dissolving the corresponding interruption cause) on the multi-function device 200. Further, according to causes of transition to the end state STE, the end state STE is associated with different messages. For example, the end state STE to which the print execution unit has transitioned due to a non-recoverable error is associated with a message for prompting the user to check the error. The end state STE to which the print execution unit has transitioned due to normal termination is associated with a message for prompting the user to collect the printed document. The end state STE to which the print execution unit has transitioned due to cancellation is associated with a message for prompting the user to check the cancelled print job.

Returning to FIG. 8 again, subsequently, in STEP S240, the communication control unit 100 determines whether the message determined in STEP S235 is different from the message having been transmitted to the portable device 400 in the previous STEP S235. The previously transmitted message is a message related to the print job to be processed, and in a case where there are messages transmitted to the portable device 400 in messages related to the print job to be processed, among the transmitted messages, a message finally transmitted to the portable device 400 is the previously transmitted message. The previously transmitted message is recorded in a predetermined storage area as will be described later.

In a case where the message determined in STEP S235 is the same as the previously transmitted message (NO in STEP S240), in STEP S245, the movement determining unit 130 determines whether the previous location of the portable device 400 is outside the specific range. The previous location of the portable device 400 is current location information acquired in STEP S215 performed previously to the previous STEP S215 and is recorded in a predetermined storage area as will be described later. The movement determining unit 130 determines whether the previous location of the portable device 400 is within the specific range or outside the specific range, in the same manner as that described in STEP S225.

In a case where the previous location of the portable device 400 is outside the specific range (YES in STEP S245), in STEP S250, the message transmitting unit 150 transmits the message determined in STEP S235, to the portable device 400. That is, in a case where the current location of the portable device 400 is within the specific range (YES in STEP S225) and the previous location of the portable device 400 is outside the specific range (YES in STEP S245), the message is transmitted to the portable device 400. In other words, in STEPS S225 and S245, the movement determining unit 130 determines whether the portable device 400 has moved from the outside of the specific range into the specific range. Then, in a case where it is determined that the portable device 400 has moved from the outside of the specific range into the specific range, even if the message determined in STEP S235 is the same as the previously transmitted message, the message transmitting unit 150 transmits the message to the portable device 400.

In a case where the message determined in STEP S235 is different from the previously transmitted message (YES in STEP S240), in STEP S250, the message transmitting unit 150 transmits the corresponding message to the portable device 400. That is, in a case where the current location of the portable device 400 is within the specific range (YES in STEP S225) and the corresponding message is different from the previously transmitted message (YES in STEP S240), the message is transmitted to the portable device 400. In other words, in the case where the portable device 400 is within the specific range, when the message to be transmitted changes in response to a change in the progress status of the printing process, the changed message is transmitted to the portable device 400, regardless of the previous location of the portable device 400.

In STEP S255, the communication control unit 100 records the transmitted message in a predetermined storage area of the non-volatile storage device 220 or the volatile storage device 230. The reason why the transmitted message is recorded is that the transmitted message is necessary in the next STEP S240 to determine whether a message which is determined in the next STEP S235 is different from the transmitted message.

In STEP S260, the current location information received from the portable device 400 in the previous STEP S215 is recorded in a predetermined storage area of the non-volatile storage device 220 or the volatile storage device 230. The reason why the current location information is recorded is that the current location information is necessary in the next STEP S245 for determining the previous location of the portable device 400 is outside the specific range. In a modification, in this step, the communication control unit 100 may record the result of the determination of STEP S225, that is, information representing whether the current location of the portable device 400 is within the specific range, instead of the current location information.

After STEP S260, the status notifying process returns to STEP S205. As a result, the above-described processes of STEPS S205 to S260 are periodically repeated until the print job to be processed is eliminated. That is, the current location information of the portable device 400 is acquired periodically (for example, at intervals of several seconds), and in a case where a message transmission condition is satisfied, a message is transmitted to the portable device 400, and in a case where the message transmission condition is not satisfied, any message is not transmitted to the portable device 400. As described above, the message transmission condition is that any one of: 1) a first condition that the portable device 400 moves from the outside of the specific range into the specific range; and 2) a second condition that the portable device 400 is located within the specific range, and the message to be transmitted changes is satisfied. As can be understood from the first condition, when the portable device 400 moves from the outside of the specific range into the specific range, even if the message has changed, the message is transmitted. Therefore, for example, even in a state in which the outputting of the printed document has completed and thus the message does not change, whenever the user moves away from the multi-function device 200 and gets closer to the multi-function device 200 once, it is possible to receive a message for prompting collecting of the printed document. Also, as can be understood from the second condition, for example, even in a case where the user has stayed within the specific range for a comparatively long period, when the message to be transmitted changes in response to the change in the progress status of the printing process, a message according to the progress status of the printing process is transmitted to the portable device 400 of the user. Therefore, the user can appropriately grasp the progress status of the printing process.

Incidentally, upon receiving the message from the multi-function device 200, the message receiving unit 320 of the portable device 400 displays the message on the display unit 470 of the portable device 400 while performing, for example, an operation of notifying the user of the reception of the message, for example, generation of a notification tone or an halftone process. In FIG. 4B, a state in which a message MA2 (the above-described operation requesting message in this example) is displayed on the display unit 470 of the portable device 400 is shown. When the user touches a button BT3 for instructing termination of display, the message receiving unit 320 finishes the display of the message.

In a case where there is no print job which is a print target (NO in STEP S205), that is, a case where the print job to be processed has been eliminated, in STEP S265, the communication control unit 100 erases the transmitted message recorded in STEP S255. Subsequently, the communication control unit 100 erases the current location information recorded in STEP S260, in STEP S270, and finishes the status notifying process. The print job is erased at an appropriate timing, for example, by the printing control unit 30. For example, when a predetermined time elapses after the print execution unit transitions to the end state STE, the printing control unit 30 may erase the print job. Also, in a case where the outputting of the printed document has normally completed, the printing control unit 30 may erase the print job after the user collects the printed document. Further, collecting of the printed document may be detected, for example, by a sheet sensor provided to a sheet discharge tray.

According to the above-described present example, the progress status specifying unit 140 specifies the current progress status from the plurality of progress statuses of the printing process. Then, in a case where the portable device 400 moves into the specific range including the location of the multi-function device 200, the message transmitting unit 150 transmits a message according to the current progress status to the portable device 400. The message transmitting unit 150 is able to transmit a plurality of different messages corresponding to the plurality of progress statuses, respectively. As a result, at a timing when the portable device 400 moves into the specific range, the portable device 400 is able to receive a message according to the current progress status of the printing process and display the corresponding message on the display unit 470. Therefore, for example, according to the received message, the user can determine an action which is to be taken to get the document output by the printing process. Therefore, it is possible to improve convenience for the user.

More specifically, after the print job is received by the job receiving unit 110, the movement determining unit 130 periodically requests the current location information from the portable device 400 in STEP S210 of FIG. 8 to periodically acquire the current location information of the portable device 400 in STEP S215 of FIG. 8, and determines whether the portable device 400 has moved into the specific range on the basis of the current location information and the location information of the multi-function device 200 (the installation position information 224), in STEP S225 of FIG. 8. Then, in a case where it is determined that the portable device 400 has not moved into the specific range, unless another message transmission condition is satisfied, the message transmitting unit 150 does not transmit any message to the multi-function device 200. In a case where the portable device 400 has moved into the specific range, the message transmitting unit 150 transmits a message to the multi-function device 200. As a result, the portable device 400 is able to receive a message at an appropriate timing, only by transmitting the current location information to the multi-function device 200 in response to the regular transmission requests. Therefore, it is possible to suppress an excessive processing load from being put on the portable device 400.

Further, the message transmitting unit 150 transmits different messages in a status before the outputting process completes (for example, the outputting state ST42), and in a status after the outputting process completes (for example, the end state STE based on normal termination), respectively. Furthermore, the message transmitting unit 150 transmits different messages in the status in which the printing completion period Tf is longer than the reference period TH, and in the status in which the printing completion period Tf is equal to or shorter than the reference period TH, respectively. As a result, the user can more appropriately determine a timing to go to the multi-function device 200 for collecting the printed document, and thus it is convenient.

Further, the period specifying unit 34 specifies a unit period necessary for the printing process of a portion of the document and specifies the printing completion period Tf on the basis of the unit period (FIG. 6). In a case where a print job for requesting outputting of a printed document of a plurality of sheets, the unit period is, for example, a period necessary for a printing process corresponding to one sheet, as described above. As a result, the period specifying unit 34 is able to accurately specify the printing completion period Tf.

In the "B" pattern (FIG. 3), the identification information transmitting unit 160 transmits the identification information (ID) for identifying the print job, to the PC 60 which is the source of the print job. Subsequently, the notification request receiving unit 170 receives the identification information of the print job (job ID) together with the message notification request, from the portable device 400. The message transmitting unit 150 transmits a message according to the progress status of the printing process based on the print job identified by the received identification information, to the portable device 400. As a result, even in a case where a device which is the source of a print job and a device which is a transmission destination of messages are different from each other, like in the "B" pattern, it is possible to transmit an appropriate message according to the progress status of the print job, to an appropriate transmission destination (the portable device 400).

Further, in a case where the printing mode is the performance start operation waiting mode, the message transmitting unit 150 transmits different messages in a status before performance start operation is received (for example, the performance start operation waiting state ST3), and in a status after performance start operation is received (for example, the performing state ST40), respectively. The message which is transmitted in the status before performance start operation is received is an operation requesting message for requesting performance start operation. As a result, in the case where the printing mode is the performance start operation waiting mode, when the user is close to the multi-function device 200, the message for requesting specific operation is displayed on the portable device of the user, and thus it is convenient.

Further, the message transmitting unit 150 transmits different messages in a status in which the printing process is interrupted due to a cause requiring the user to perform a treatment on the multi-function device 200 (for example, the interrupted state ST43), and in a status in which the printing process is not interrupted (for example, the outputting state ST42), respectively. The message which is transmitted in a status in which the printing process is interrupted is a treatment requesting message for requesting a treatment on the multi-function device 200. As a result, in the case where the printing process is interrupted, when the user is close to the multi-function device 200, the message for requesting a treatment on the multi-function device 200 is displayed on the portable device of the user, and thus it is convenient for the user.

Further, the range determining unit 120 determines a specific range for each portable device which is a message transmission destination, on the basis of the distance designating information AD which is range information for designating the specific range, in STEP S207 of FIG. 8. That is, in a case where the portable device 400A and the portable device 400B transmit different distance designating information AD to the multi-function device 200, respectively, different ranges are determined as a specific range A for the portable device 400A and a specific range B for the portable device 400B, respectively. Then, in a case where the portable device 400A moves into the specific range A, the message transmitting unit 150 transmits a message to the portable device 400A. Further, in a case where the portable device 400B moves into the specific range B, the message transmitting unit 150 transmits a message to the portable device 400B. As a result, the user can receive the message at a timing more preferable to the user, by designating the distance designating information AD.

Further, not only in a case where the portable device 400 has moved from the outside of the specific range into the specific range, but also in a case where the portable device 400 is located within the specific range and the message to be transmitted has changed, the message transmitting unit 150 transmits a message to the portable device 400. As a result, even in a case where the user stays in the specific range for a comparatively long period, a message according to the progress status of the printing process is transmitted to the portable device 400 of the user. Therefore, the user can appropriately grasp the progress status of the printing process.

As can be understood from the above description, in the first example, each of the status before the specific operation is received like the performance start operation waiting state ST3, the status in which the printing process is interrupted like the interrupted state ST43, the status before the outputting process is completed like the image developing state ST41, and the status in which the printing completion period Tf is longer than the reference period TH is an example of a first kind of progress status, and messages (FIG. 9) associated with those listed progress statuses are examples of a first kind of message. Similarly, in the first example, each of the status after the specific operation is received like the printing process state ST4, the status in which the printing process is not interrupted like the outputting state ST42, the status after the outputting process is completed like the end state STE attributable to normal termination, and the status in which the printing completion period Tf is equal to or shorter than the reference period TH is an example of a second kind of progress status, and messages (FIG. 9) associated with those listed progress statuses are examples of a second kind of message.

B. Second Example

FIG. 10 is a flow chart of a status notifying process according to a second example.

In the second example, unlike in the first example, the message receiving unit 320 of the portable device 400 automatically and periodically transmits the current location information of the portable device 400, to the multi-function device 200. For example, the message receiving unit 320 periodically transmits the message notification request including the current location information, to the multi-function device 200. Then, the communication control unit 100 of the multi-function device 200 performs the status notifying process shown in FIG. 10, alternative to the status notifying process shown in FIG. 8, so as to transmit the message to the portable device 400 at an appropriate timing.

Specifically, the status notifying process shown in FIG. 10 is different from the status notifying process shown in FIG. 8 in that, alternative to STEPS S210 and S215, STEP S210A of FIG. 10 is performed. That is, the movement determining unit 130 of the communication control unit 100 waits for the portable device 400 to autonomously transmit the current location information, without requesting the current location information from the portable device 400 (STEP S210A of FIG. 10). Then, when the current location information is received from the portable device 400 (YES in STEP S210A), the status notifying process proceeds to STEP S220. The other steps of the status notifying process shown in FIG. 10 are identical to steps of the status notifying process shown by the same reference symbols in FIG. 8, and thus will be omitted.

According to the second example, the same effects as those of the first example are achieved. Further, according to the second example, since the portable device 400 autonomously transmits the current location information to the multi-function device 200, it is possible to reduce communication traffic on a wireless network, as compared to the first example.

C. Modifications (1) In the above-described each example (for example, FIG. 8), the message transmitting unit 150 of the multi-function device 200 transmits a message to the portable device 400. Alternatively, information specifying a message (such as a message number) may be transmitted to the portable device 400. In this case, for example, the portable device 400 may have information (such as a table) defining the correspondence between messages and message numbers. Then, upon receiving a message number from the multi-function device 200, the message receiving unit 320 of the portable device 400 may display a message corresponding to the received message number, with reference to the information defining the correspondence.

Further, in the above-described each example, the message receiving unit 320 of the portable device 400 displays a message transmitted from the multi-function device 200, on the display unit 470. However, the message receiving unit 320 may output the corresponding message to the user by other methods. For example, the message receiving unit 320 may output the corresponding message to the user by other methods by outputting voice reading the corresponding message or outputting sounds, vibrations, or the like corresponding to the corresponding message. In this case, it is preferable to explain the correspondence of messages to sounds or vibrations with a manual or the like in advance to the user.

In general, the message transmitting unit 150 needs only to transmit a message or information necessary for the portable device 400 to output a message (also referred to as message-related information) such as information specifying a message, to the portable device 400.

(2) In the above-described each example, the printing completion period Tf is actually specified (FIG. 6), and a message to be transmitted is changed according to whether the printing completion period Tf is longer than the reference period TH (FIG. 9). Alternatively, it is possible to determine whether it is a situation in which the printing completion period Tf is comparatively long, or a situation in which the printing completion period Tf is comparatively short, on the basis of a simple reference, without specifying the printing completion period Tf, and to change a message to be transmitted. For example, on the basis of whether the remaining number of sheets to be printed is a reference value or more, or not, it may be determined whether it is a situation in which the printing completion period Tf is comparatively long, or a situation in which the printing completion period Tf is comparatively short.

(3) In the above-described each example, the message transmitting unit 150 transmits all messages only in a case where the above-described message transmission condition is satisfied, and does not transmit any message in a case where the message transmission condition is not satisfied. However, the present invention is not limited thereto. The message transmitting unit 150 may transmit some messages even if the message transmission condition is not satisfied. For example, in a case where an error requiring the user to transmit the print job again occurs, it may be considered a possibility that the user can transmit the print job again from the portable device 400 without going to the position of the multi-function device 200. For this reason, in a case where that error occurs, the message transmitting unit 150 may immediately transmit a message for notifying the occurrence of the error, to the portable device 400, regardless of the position of the portable device 400. In general, the message transmitting unit 150 needs only to transmit two or more messages, corresponding to at least two or more progress statuses of the printing process, to the portable device 400, from when the print job is received to when outputting of the printed document is completed, on a condition that the portable device 400 moves into the specific range.

(4) The message transmission condition in the above-described each example is that any one of: 1) a first condition that the portable device 400 moves from the outside of the specific range into the specific range; and 2) a second condition that the portable device 400 is located within the specific range, and the message to be transmitted changes is satisfied, as described above. In addition to these two conditions, other message transmission conditions may be included. For example, 3) a third condition that the portable device 400 is located within the specific range, and a predetermined period elapses after a message is finally transmitted may be added to the message transmission condition. In this case, when the user stays within the specific range for a comparatively long period, whenever the predetermined period elapses, a message according to the progress status of the printing process is transmitted to the portable device 400 of the user. As a result, it is possible to suppress the user from forgetting collecting of the printed document, performance start operation, a treatment for dissolving an interruption cause, or the like, and thus it is convenient for the user.

(5) In the above-described each example, in the "A" pattern (FIG. 2), the distance designating information AD is included in the print job which is transmitted to the multi-function device 200, and in the "B" pattern (FIG. 3), the distance designating information AD is included in the message notification request which is transmitted to the multi-function device 200. As an alternative to this, the distance designating information AD may be included in the current location information which is periodically transmitted from the portable device 400 in the status notifying process, that is, the current location information which is periodically received by the multi-function device 200 in STEP S215 of FIG. 8. As another alternative, the distance designating information AD may be a fixed value (default value) recorded in advance in the multi-function device 200. Further, the multi-function device 200 may have a table in which distance designating information AD are associated with the portable devices 400 or users of the portable devices 400 in advance. The multi-function device 200 may provide a WEB service (for example, embedded web server (EWS) or the like) for enabling the user to use the PC 60 or a portable device 400 to access the multi-function device 200, thereby editing the distance designating information AD recorded in the table. In this case, the range determining unit 120 of the multi-function device 200 may acquire information for identifying the portable device 400, or information for identifying the user of the portable device 400, from the portable device 400 or the PC 60, and acquire the distance designating information AD with reference to the table.

(6) The specific range which is used to determine whether to transmit a message does not need to be a sphere having a radius Rth from the multi-function device 200, and may be a two-dimensional or three-dimensional range including at least the multi-function device 200. For example, the specific range may be a range corresponding to the shape of a room where the multi-function device 200 is installed.

(7) In the above-described examples, the movement determining unit 130 uses the current location information which is acquired by use of the GPS unit 480 of the portable device 400, in the method of determining whether the portable device 400 is within the specific range in order for determining whether the portable device 400 has moved into the specific range. As an alternative to this, in a case where the portable device 400 and the multi-function device 200 are able to communicate with each other by use of near field communication (such as Bluetooth (which is a registered trademark) or infrared communication) in which a communicable distance is comparatively short, the movement determining unit 130 may determine whether the portable device 400 is located within the specific range according to whether it is possible to communicate with the portable device 400, for example, by the near field communication. For example, in a case of performing a process of establishing near field communication with the portable device 400, whereby the corresponding communication is established, the movement determining unit 130 may determine that the portable device 400 is located within the specific range. In this case, the specific range may be defined as a range in which it is possible to perform communication by near field communication to be used. Further, in a case where the portable device 400 and the multi-function device 200 are able to perform wireless communication directly (that is, without intermediating of an access point 50 or the like) like the near field communication, an ad hoc mode of a wireless LAN, or Wi-Fi direct, it is possible to determine whether the portable device 400 is located within the specific range, on the basis of the intensity of an electric wave which is received from the portable device 400. For example, in a case where the intensity of an electric wave which is received from the portable device 400 is a predetermined reference value or more, the movement determining unit 130 may determine that the portable device 400 is located within the specific range.

(8) In the above-described examples, communication between the portable device 400 and the multi-function device 200, and communication between the PC 60 and the multi-function device 200, specifically, reception of a print job by the job receiving unit 110 of the multi-function device 200, reception of a message notification request by the notification request receiving unit 170, transmission of a job ID by the identification information transmitting unit 160, and transmission of a message by the message transmitting unit 150 are performed by use of wireless communication through an access point 50 (wireless communication in the infrastructure mode). Alternatively, some or all of those communications may be performed by use of various communication methods exemplified in the above-described Modification (6), for example, an ad hoc mode of a wireless LAN, Wi-Fi direct, Bluetooth (which is a registered trademark), infrared communication, etc.

(9) In the "B" pattern (FIG. 3) of the above-described each example, when the message notification request is transmitted for the first time to the multi-function device 200, the job ID is included in the message notification request which is transmitted. Thereafter, the job ID is not transmitted from the portable device 400 to the multi-function device 200. Alternatively, for example, in a case where the message notification request is periodically transmitted from the portable device 400 like in the second example, the portable device 400 may periodically transmit the job ID together with the message notification request to the multi-function device 200.

(10) The portable device 400 of the above-described each example has the printer driver 300. However, in the case of the "B" pattern, the portable device 400 may have only a function as the message receiving unit 320, and may not have the function of a printer driver for transmitting print jobs.

(11) In the "B" pattern (FIG. 3) of each above-described example, the job ID is used to associate the print job with the portable device 400 which is the message transmission destination. For example, when transmitting the print job to the multi-function device 200 in STEP S61B of FIG. 3, the PC 60 may include the IP address of the portable device 400 which is the message transmission destination, in the print job. The multi-function device 200 may record the corresponding IP address in association with the print job, thereby associating the print job with the portable device 400 which is the message transmission destination. In this case, it is possible to omit STEPS S21B and S62B of FIG. 3.

(12) In the above-described each example, the message transmitting unit 150 transmits the message to the multi-function device 200. However, the message transmitting unit 150 may transmit information representing the printing completion period Tf recorded in the progress status information 222, in addition to the message. In this case, the message receiving unit 320 is able to display the printing completion period Tf, in addition to the message, on the display unit 470 of the portable device 400. As a result, the user can more accurately grasp the timing for the printed document to be completed, and thus it is convenient for determining the timing to collect the printed document.

(13) In the above-described each example, as shown in the flow charts of FIGS. 8 and 10, in a case where the movement determining unit 130 determines that the portable device 400 is within the specific range (YES in STEP S225), in STEP S230, the progress status specifying unit 140 specifies the progress status of the printing process. Alternatively, the progress status specifying unit 140 may specify the progress status of the printing process, regardless of the current location of the portable device 400. For example, regardless of the current location of the portable device 400, the progress status specifying unit 140 may specify the progress status of the printing process periodically, specifically, at comparatively short intervals such as 3 seconds. Then, in a case where the portable device 400 has moved from the outside of the specific range into the specific range, or in a case where the portable device 400 is located within the specific range and a message to be transmitted has changed, the message transmitting unit 150 may transmit a message according to the specified progress status of the printing process, to the portable device 400.

(14) In the above-described examples, some of components implemented by hardware may be replaced by software, and conversely, some of components implemented by software may be replaced by hardware.

(15) In a case where some or all of the functions of the present invention are implemented by software, the software (computer program) may be stored on a computer-readable recording media to be provided. The computer-readable recording media are not limited to portable recording media such as memory cards and CD-ROMs, but include various internal storage devices such as a RAM and a ROM built in a computer, and external storage devices such as a hard disk drive connected to a computer.

(16) The processes disclosed in the examples may be performed by a single CPU, a plurality of CPUs, hardware such as an ASIC, or a combination of them.

Although examples and modifications of the invention are described above, the examples are provided for the purpose of helping better understanding of the invention but do not limit the scope of the invention. The invention may include alterations, changes, and modifications of the examples without departing from the scope of claims, and also includes equivalents thereof.

What is claimed is:

1. A printing apparatus configured to perform wireless communication with a portable device, the printing apparatus comprising:
    a network interface;
    a print execution unit;
    a processor; and
    a memory storing computer-readable instructions that, when executed by the processor, cause the printing apparatus to perform:
        receiving a print job;
        controlling the print execution unit to perform a printing process based on the print job;
        specifying a current progress status from among a plurality of progress statuses of the printing process including a first kind of progress status regarding a status of the printing process within a period from receipt of an instruction by a user to start the printing process to a specific time point before completion of discharging a printed sheet and a second kind of progress status regarding a status of the printing process within a period from the specific time point to the completion of discharging the printed sheet;
        detecting a location of a portable device, the portable device being a transmission destination of information related to each progress status of the printing process;
        determining whether the location of the portable device is in a specific range including a location of the printing apparatus;
        selecting a specific information to be sent to the portable device based on the current progress status of the printing process, the specific information being selected from among a plurality of kind of specific information including a first kind of specific information related to the first kind of progress status and a second kind of specific information related to the second kind of progress status and being different from the first kind of specific information;
        determining whether the specific information selected based on the current progress status of the printing process is the same as a previous specific information that is previously selected and sent to the portable device;
        determining whether a previous location of the portable device that is previously detected is not in the specific range;
        transmitting the first kind of specific information to the portable device in a case where the current progress status is the first kind of progress status, in response to determining that a current location of the portable device is in the specific range and the previous location of the portable device is not in the specific range; and
        transmitting the second kind of specific information to the portable device in a case where the current progress status is the second kind of progress status, in response to determining that the current location of the portable device is in the specific range and the previous location of the portable device is not in the specific range.

2. The printing apparatus according to claim 1, wherein the memory stores the computer-readable instructions that, when executed by the processor, cause the printing apparatus to further perform:
    determining whether the portable device has moved into the specific range,
    periodically acquiring location information representing a location of the portable device from the portable device,
    determining whether the portable device has moved within the specific range based on the location information representing the location of the portable device and location information of the printing apparatus,
    skipping the transmitting of the specific information to the portable device in response to determining that the portable device has not moved within the specific range; and
    transmitting the specific information to the portable device in response to determining that the portable device has moved within the specific range.

3. The printing apparatus according to claim 2, wherein the memory stores the computer-readable instructions that, when executed by the processor, cause the printing apparatus to further perform:

periodically requesting the location information from the portable device so as to periodically acquire the location information from the portable device after the print job is received.

4. The printing apparatus according to claim 1,
wherein the printing process comprises:
a print data generating process of generating print data by use of image data that is included in the print job; and
an outputting process of outputting a printed document by use of the print data,
wherein the first kind of progress status includes a status before the outputting process has completed, and
wherein the second kind of progress status includes a status after the outputting process has completed.

5. The printing apparatus according to claim 1,
wherein the printing process comprises:
a print data generating process of generating print data by use of image data that is included in the print job; and
an outputting process of outputting a printed document by use of the print data,
wherein the first kind of progress status includes a status in which a completion period necessary to complete the outputting process is longer than a reference, and
wherein the second kind of progress status includes a status in which the completion period is equal to or shorter than the reference.

6. The printing apparatus according to claim 5,
wherein the print job includes a request to output the printed document of a plurality of sheets, and
wherein the memory stores the computer-readable instructions that, when executed by the processor, cause the printing apparatus to further perform:
specifying a unit period necessary for the printing process of a portion of the print job so as to specify the completion period based on the unit period.

7. The printing apparatus according to claim 5, wherein the completion period is determined based on at least one of a number of colors included in an image of the print job, a resolution of the image, a paper size of the sheet on which the printing process is performed, and a number of sheets.

8. The printing apparatus according to claim 1,
wherein the memory stores the computer-readable instructions that, when executed by the processor, cause the printing apparatus to further perform:
transmitting identification information for identifying the print job, to a source of the print job;
receiving the identification information from the portable device;
specifying the current progress status of the printing process based on the print job which is identified by the identification information received from the portable device; and
transmitting the specific information according to the current progress status to the portable device that is a source of the identification information.

9. The printing apparatus according to claim 1, further comprising:
an operation unit configured to receive a user operation,
wherein the printing apparatus is configured to operate in a specific printing mode for requesting specific operation on the operation unit to start outputting a printed document based on the print job,
wherein the first kind of progress status includes a status before the specific operation is received,
wherein the second kind of progress status includes a status after the specific operation is received, and
wherein the first kind of specific information includes information for outputting an operation requesting message that is transmitted in a case where the current progress status in the specific printing mode is the status before the specific operation is received, the operation requesting message including message for requesting the specific operation.

10. The printing apparatus according to claim 1, wherein the memory stores the computer-readable instructions that, when executed by the processor, cause the printing apparatus to further perform:
determining the specific range for each portable device based on range information for designating the specific range;
transmitting the specific information according to the current progress status to a first portable device in a case where the first portable device has moved into a first specific range; and
transmitting the specific information according to the current progress status to a second portable device in a case where the second portable device has moved into a second specific range.

11. The printing apparatus according to claim 1, wherein the memory stores the computer-readable instructions that, when executed by the processor, cause the printing apparatus to further perform:
transmitting the specific information to the portable device in a case where the portable device is within the specific range, when a message according to the current progress status changes in response to a change in the current progress status.

12. The printing apparatus according to claim 1,
wherein the first kind of progress status includes a status in which the printing process is interrupted due to a specific error requiring a treatment on the printing apparatus by a user,
wherein the second kind of progress status includes a status in which the printing process is not interrupted, and
wherein the first kind of specific information includes information for outputting a treatment requesting message that is transmitted in the status in which the printing process is interrupted, the treatment requesting message including a message for requesting a treatment on the printing apparatus.

13. The printing apparatus according to claim 1,
wherein the printing processing includes a first partial process and a second partial process,
wherein the first kind of progress status is a first time period during which the first partial process is performed, and
wherein the second kind of progress status is a second time period during which the second partial process is performed.

14. A non-transitory computer-readable medium having a computer program stored thereon and readable by a computer of a printing apparatus, which is configured to perform wireless communication with portable devices, the computer program, when executed by the computer, causes the computer to perform operations comprising:
receiving a print job;
specifying a current progress status from among a plurality of progress statuses of a printing process including a first kind of progress status regarding a status of the printing process within a period from receipt of an instruction by a user to start the printing process to a specific time point before completion of discharging a printed sheet and a second kind of progress status regarding a status of the printing process within a period from the specific time point to the completion of discharging the printed sheet;

performing a printing process by use of the printing apparatus; and detecting a location of a portable device, the portable device being a transmission destination of information related to each progress status of the printing process;

determining whether the location of the portable device is in a specific range including a location of the printing apparatus;

selecting a specific information to be sent to the portable device based on the current progress status of the printing process, the specific information being selected from among a plurality of kind of specific information including a first kind of specific information related to the first kind of progress status and a second kind of specific information related to the second kind of progress status;

determining whether the specific information selected based on the current progress status of the printing process is the same as a previous specific information that is previously selected and sent to the portable device;

determining whether a previous location of the portable device that is previously detected is not in the specific range;

transmitting the first kind of specific information to the portable device in a case where the current progress status is the first kind of progress status, in response to determining that a current location of the portable device is in the specific range and the previous location of the portable device is not in the specific range; and transmitting the second kind of specific information to the portable device in a case where the current progress status is the second kind of progress status, in response to determining that the current location of the portable device is in the specific range and the previous location of the portable device is not in the specific range.

15. A printing apparatus configured to perform wireless communication with a portable device, the printing apparatus comprising:
 a network interface;
 a print execution unit;
 a processor; and
 a memory storing computer-readable instructions that, when executed by the processor, cause the printing apparatus to perform:
  receiving a print job;
   controlling the print execution unit to perform a printing process based on the print job;
   specifying a current progress status from among a plurality of progress statuses of the printing process including a first kind of progress status regarding a status of the printing process within a period from receipt of an instruction by a user to start the printing process to a specific time point before completion of discharging a printed sheet and a second kind of progress status regarding a status of the printing process within a period from the specific time point to the completion of discharging the printed sheet;

detecting a location of a portable device, the portable device being a transmission destination of information related to each progress status of the printing process;
  determining whether the location of the portable device is in a specific range including a location of the printing apparatus;
  selecting a specific information to be sent to the portable device based on the current progress status of the printing process, the specific information being selected from among a plurality of kind of specific information including a first kind of specific information related to the first kind of progress status and a second kind of specific information related to the second kind of progress status and being different from the first kind of specific information;
  determining whether the specific information selected based on the current progress status of the printing process is the same as a previous specific information that is previously selected and sent to the portable device;
  determining whether a previous location of the portable device that is previously detected is not in the specific range;
  transmitting the first kind of specific information to the portable device in a case where the current progress status is the first kind of progress status, in response to determining that a current location of the portable device is in the specific range and the previous location of the portable device is not in the specific range; and
  transmitting the second kind of specific information to the portable device in a case where specified that the current progress status is the second kind of progress status after the first kind of specific information is transmitted to the portable device, in response to determining that the current location of the portable device is in the specific range and the previous location of the portable device is not in the specific range.

16. A non-transitory computer-readable medium having a computer program stored thereon and readable by a computer of a printing apparatus, which is configured to perform wireless communication with portable devices, the computer program, when executed by the computer, causes the computer to perform operations comprising:
 receiving a print job;
 specifying a current progress status from among a plurality of progress statuses of a printing process including a first kind of progress status regarding a status of the printing process within a period from receipt of an instruction by a user to start the printing process to a specific time point before completion of discharging a printed sheet and a second kind of progress status regarding a status of the printing process within a period from the specific time point to the completion of discharging the printed sheet;
 performing the printing process by use of the printing apparatus;
  detecting a location of a portable device, the portable device being a transmission destination of information related to each progress status of the printing process;
  determining whether the location of the portable device is in a specific range including a location of the printing apparatus;

selecting a specific information to be sent to the portable device based on the current progress status of the printing process, the specific information being selected from among a plurality of kind of specific information including a first kind of specific information related to the first kind of progress status and a second kind of specific information related to the second kind of progress status;

determining whether the specific information selected based on the current progress status of the printing process is the same as a previous specific information that is previously selected and sent to the portable device;

determining whether a previous location of the portable device that is previously detected is not in the specific range;

transmitting the first kind of specific information to the portable device in a case where the current progress status is the first kind of progress status, in response to determining that a current location of the portable device is in the specific range and the previous location of the portable device is not in the specific range; and transmitting the second kind of specific information to the portable device in a case where the current progress status is the second kind of progress status after the first kind of specific information is transmitted to the portable device, in response to determining that the current location of the portable device is in the specific range and the previous location of the portable device is not in the specific range.

\* \* \* \* \*